(12) United States Patent
Yamaki

(10) Patent No.: US 7,623,777 B2
(45) Date of Patent: Nov. 24, 2009

(54) CAMERA

(75) Inventor: Hideaki Yamaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 359 days.

(21) Appl. No.: 11/260,703

(22) Filed: Oct. 27, 2005

(65) Prior Publication Data

US 2006/0093340 A1 May 4, 2006

(30) Foreign Application Priority Data

Nov. 2, 2004 (JP) .............................. 2004-319056

(51) Int. Cl.
*G03B 17/00* (2006.01)
(52) U.S. Cl. ..................... 396/56; 348/211.2
(58) Field of Classification Search ............ 396/56, 396/374; 348/376, 333.01, 375, 211.2; 455/556.1
See application file for complete search history.

(56) References Cited

U.S. PATENT DOCUMENTS

| 6,677,904 | B2 * | 1/2004 | Lichtfuss ............... 396/56 |
| 2002/0077145 | A1 * | 6/2002 | Kamiya et al. ........... 455/550 |
| 2003/0160891 | A1 * | 8/2003 | Mikamo ................ 348/375 |
| 2004/0198474 | A1 * | 10/2004 | Jung et al. ............. 455/575.1 |
| 2004/0203535 | A1 * | 10/2004 | Kim et al. .............. 455/90.3 |
| 2004/0209645 | A1 * | 10/2004 | Park et al. ............. 455/556.1 |
| 2006/0097927 | A1 * | 5/2006 | Satoh et al. ............ 343/702 |
| 2006/0111146 | A1 * | 5/2006 | Kim .................... 455/557 |

FOREIGN PATENT DOCUMENTS

| JP | 2002-112089 A | 4/2002 |
| JP | 2003-172862 A | 6/2003 |
| JP | 2003-298908 A | 10/2003 |

OTHER PUBLICATIONS

Buying the Right Digital Camera. Microsoft Corporation, May 1, 2002. Retreived from the Internet <URL:http://www.microsoft.com/windowsxp/using/digitalphotography/thebigpicture/rightcamera.mspx>.*

* cited by examiner

*Primary Examiner*—Melissa J. Koval
*Assistant Examiner*—Autumn Parker
(74) *Attorney, Agent, or Firm*—Cowan, Liebowitz & Latman, P.C.

(57) ABSTRACT

A camera which can place an antenna for performing wireless communication at an ideal position without providing a complicated mechanism is disclosed. The camera has a camera body, a movable portion which can be projected from and retracted in the camera body to take an image or observe an image, and an antenna which is formed in the movable portion to perform wireless communication.

1 Claim, 23 Drawing Sheets

CAMERA

BACKGROUND OF THE INVENTION

The present invention relates to a camera which has an antenna for performing wireless communication.

Japanese Patent Application Laid-Open No. 2003-124722 has disclosed a camera which includes an on-board antenna or an antenna realized by a wiring board pattern and at least an RF (Radio Frequency) portion disposed on a single wiring board.

In the camera, the wiring board is movable relative to a housing such that the wiring board is moved to project the antenna outside the housing during wireless communication and the wiring board is retracted in the housing except during wireless communication.

In the portable electronic apparatus disclosed in Japanese Patent Application Laid-Open No. 2003-124722, however, the dedicated member (the wireless board) is provided and the antenna is mounted in the dedicated member when the antenna is implemented. The basic structure thereof is similar to that of a retractable rod antenna for use in mobile telephones or the like. Thus, the antenna mounting requires a complicated mechanism to prevent a reduction in size, weight, and cost of the portable electronic apparatus.

BRIEF SUMMARY OF THE INVENTION

It is thus an object of the present invention to provide a camera which can place an antenna for performing wireless communication at an ideal position without providing a complicated mechanism.

According to an aspect, the present invention provides a camera has a camera body, a movable portion which can be projected from and retracted in the camera body to take an image or observe an image, and an antenna which is formed in the movable portion to perform wireless communication.

Further objects and features of the present invention will become apparent from the following detailed description of preferred embodiments with reference to the attached drawings.

DETAILED DESCRIPTION OF THE PREFERRED EMBODIMENTS

Preferred embodiments of the present invention will hereinafter be described with reference to the drawings.

Embodiment 1

Figure 1:
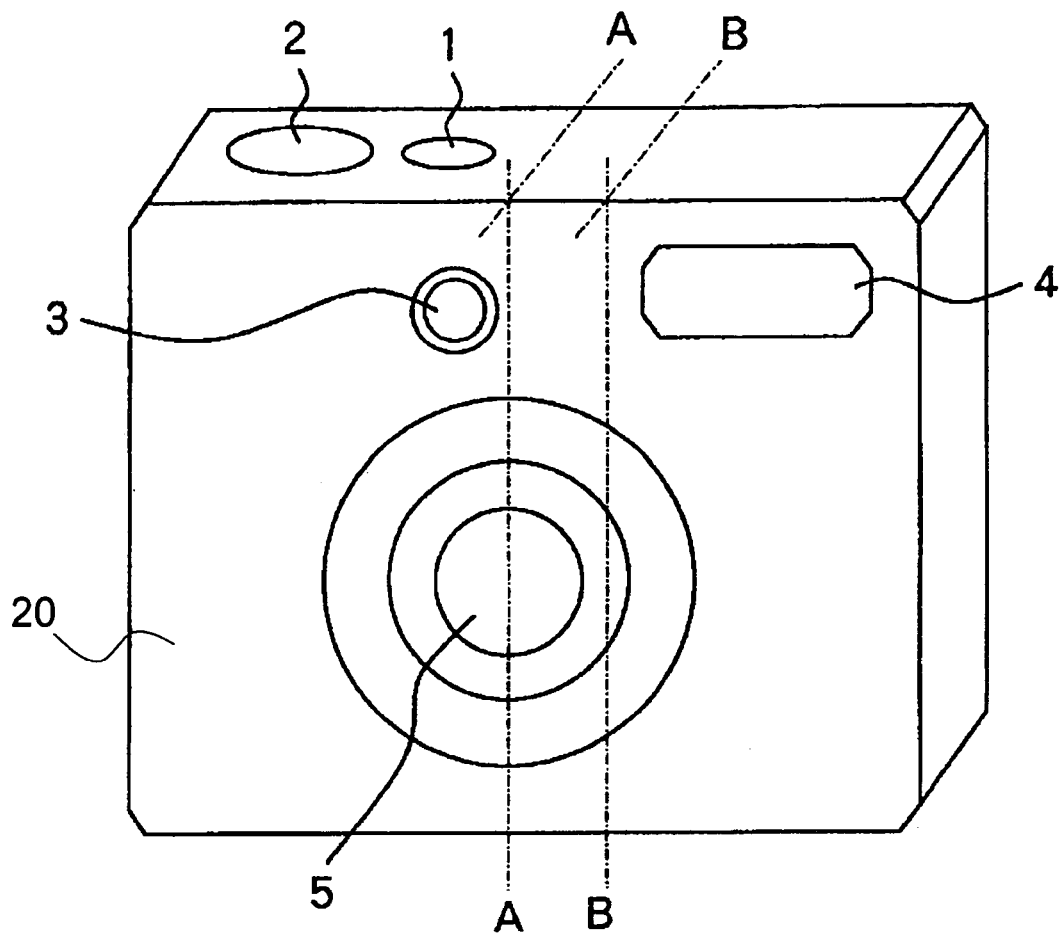
FIG. 1 shows the outer appearance of a camera which is Embodiment 1 of the present invention.
Figure 2:
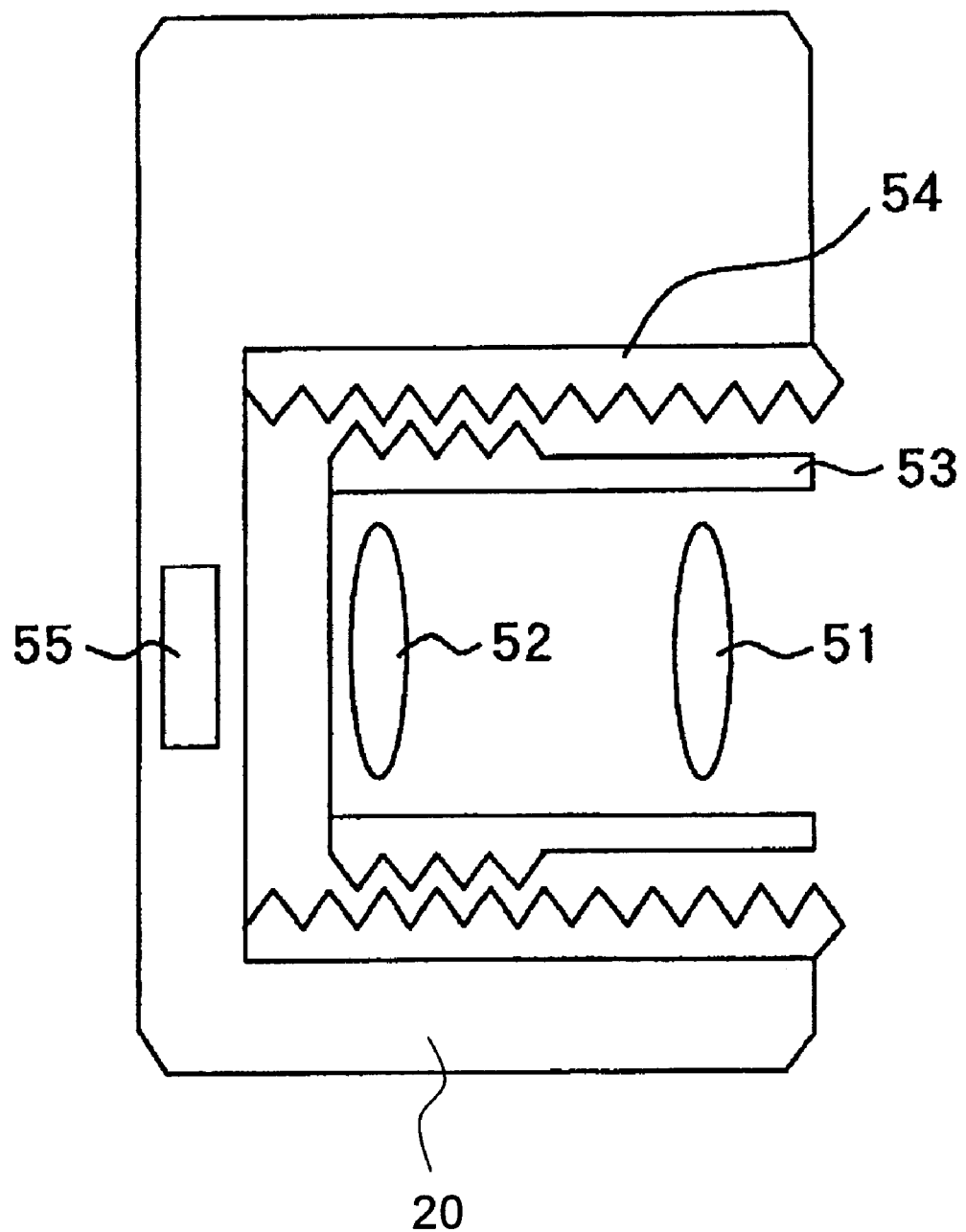
FIGS. 2 to 5 are section views of the camera in Embodiment 1.
Figure 3:
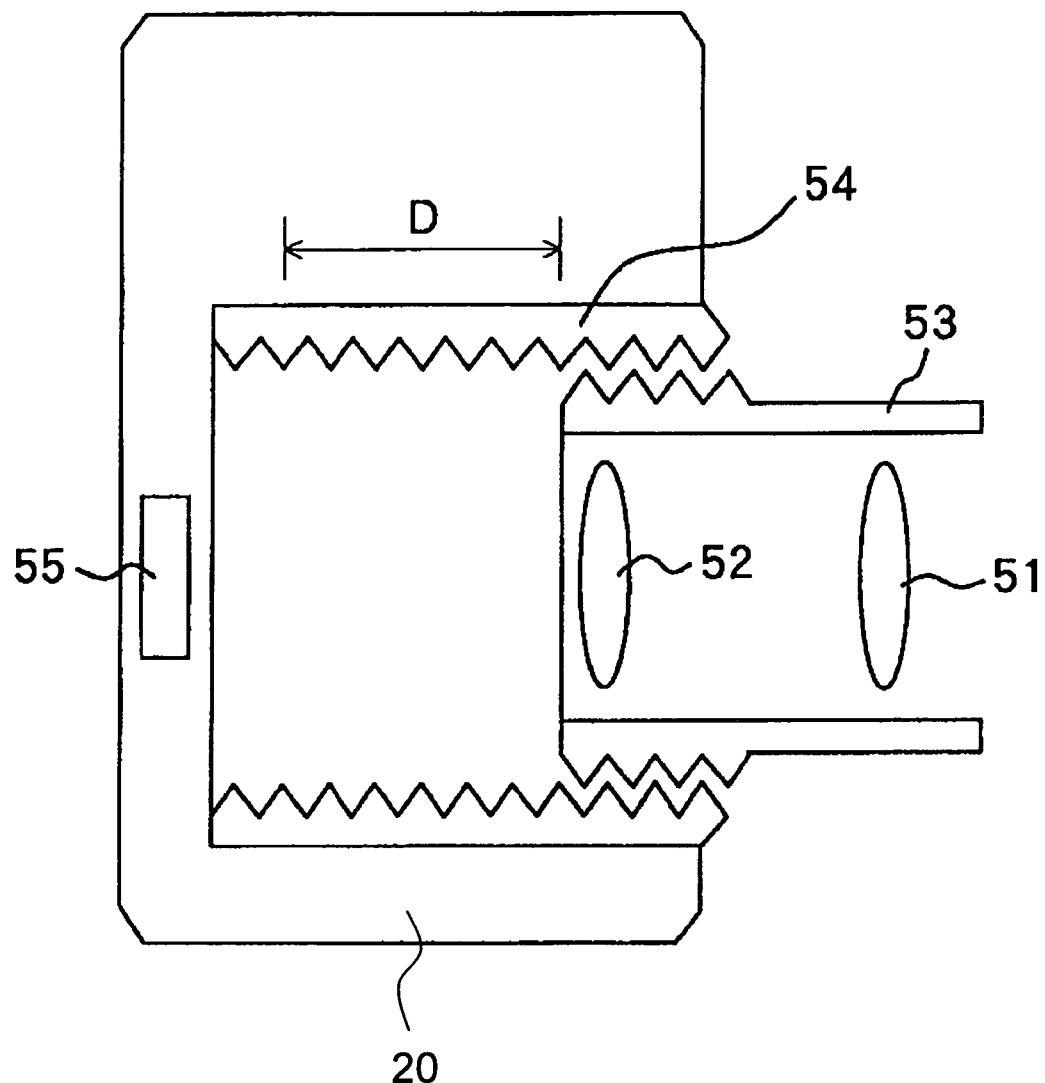
Figure 4:
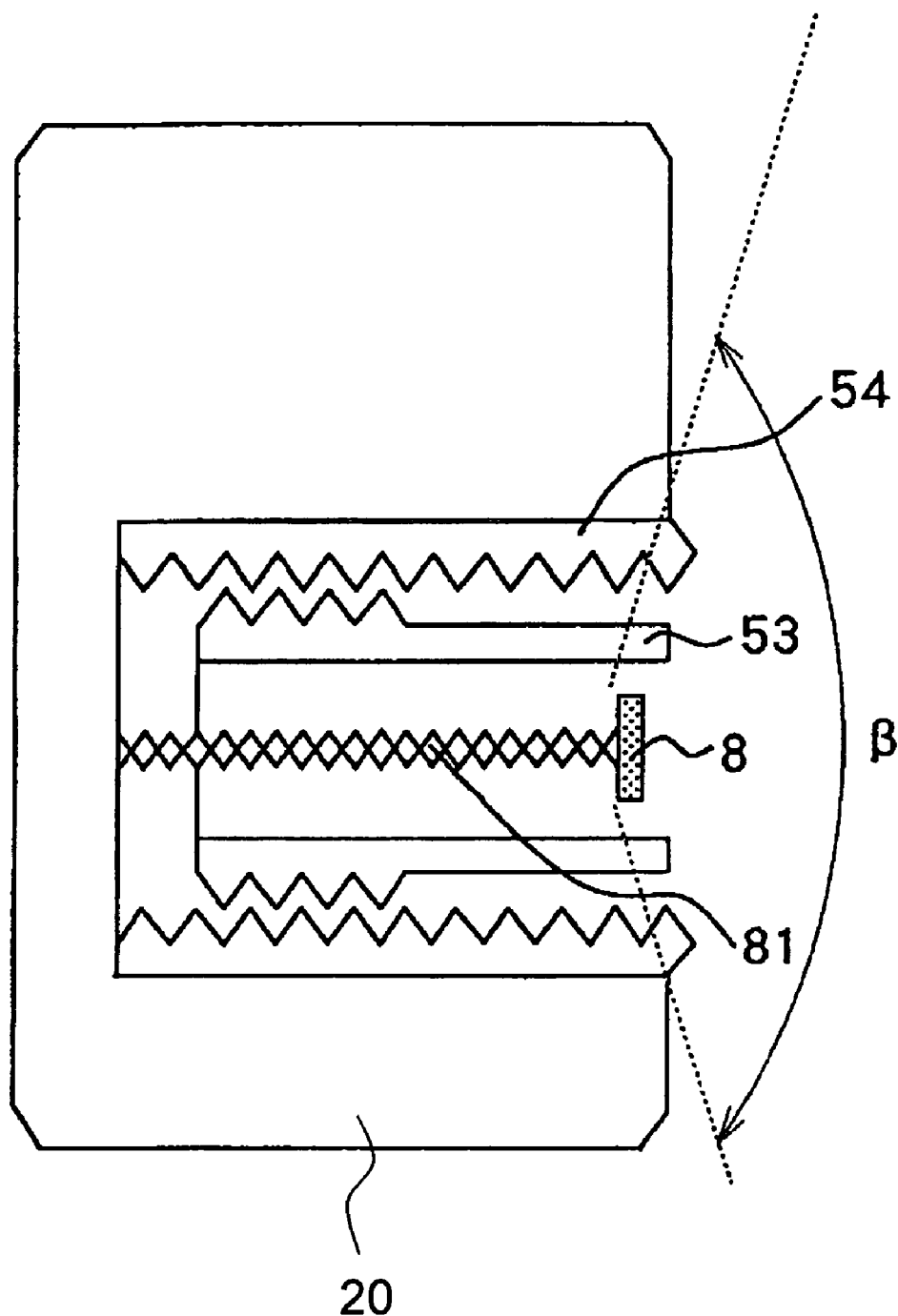
Figure 5:
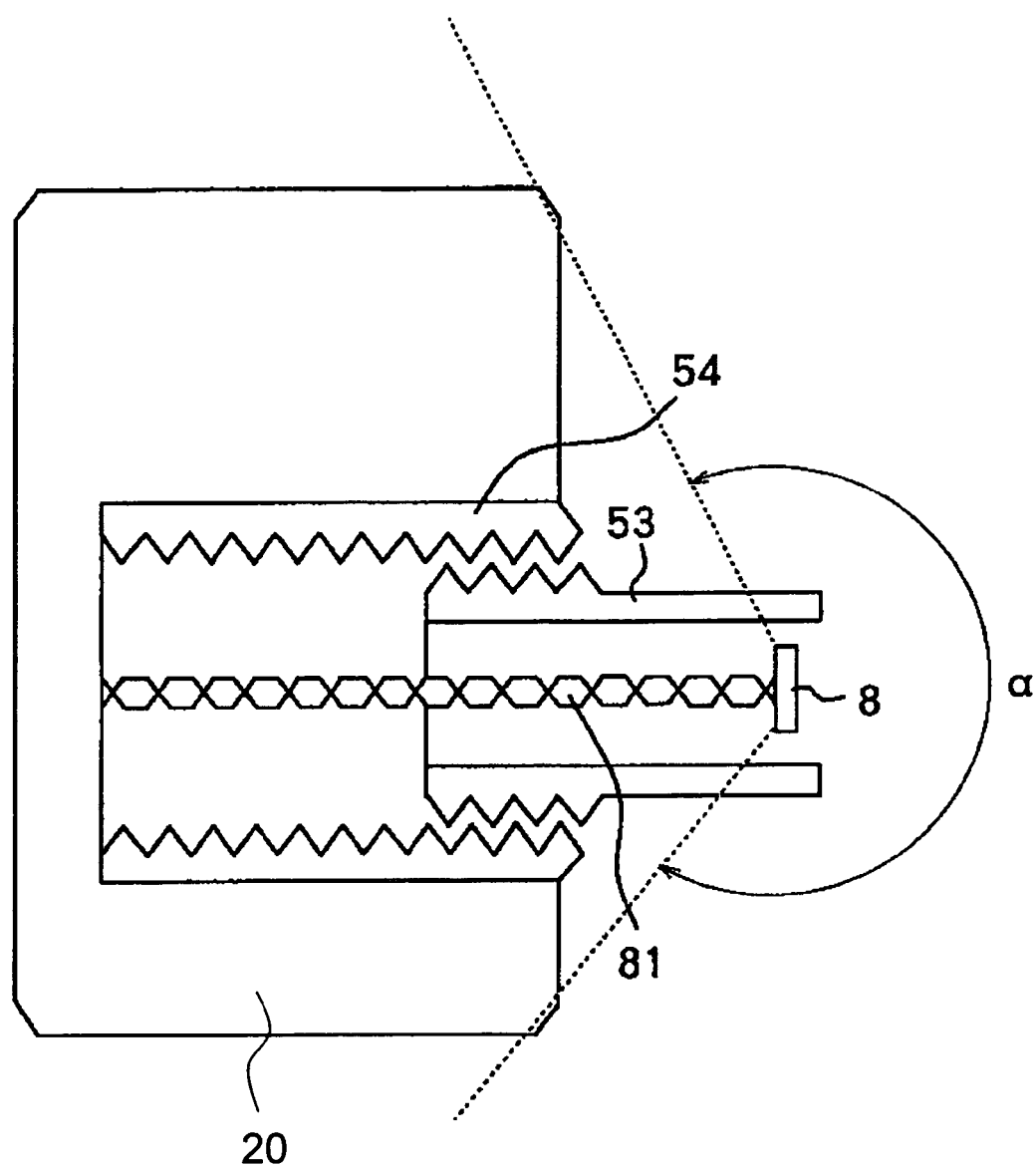
Figure 7:
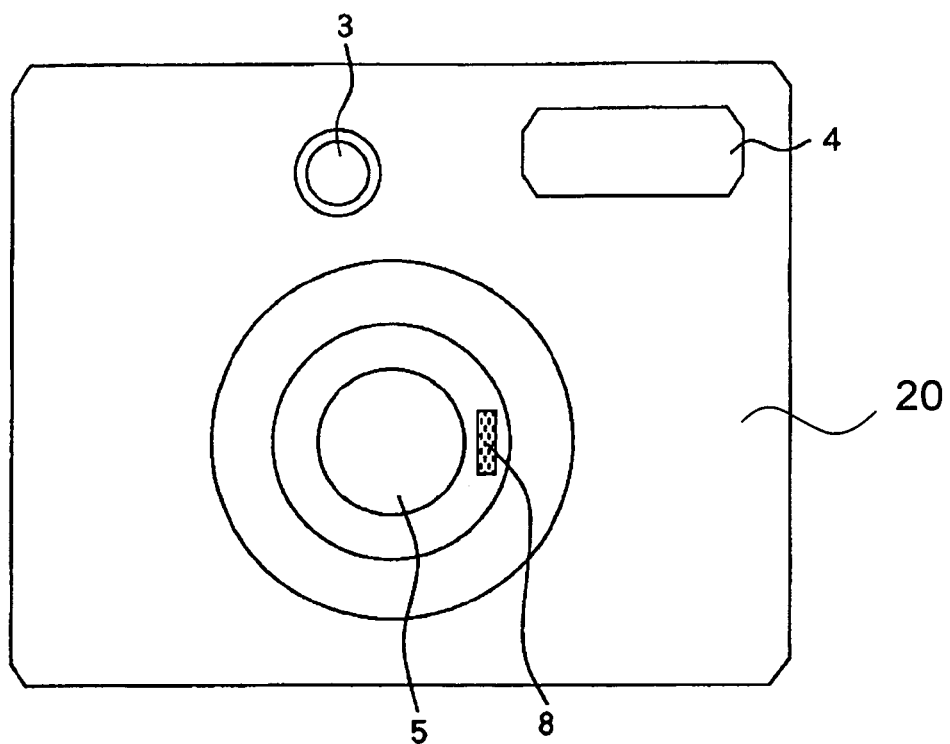
FIGS. 7 and 8 are front views of the camera in Embodiment 1.
Figure 8:
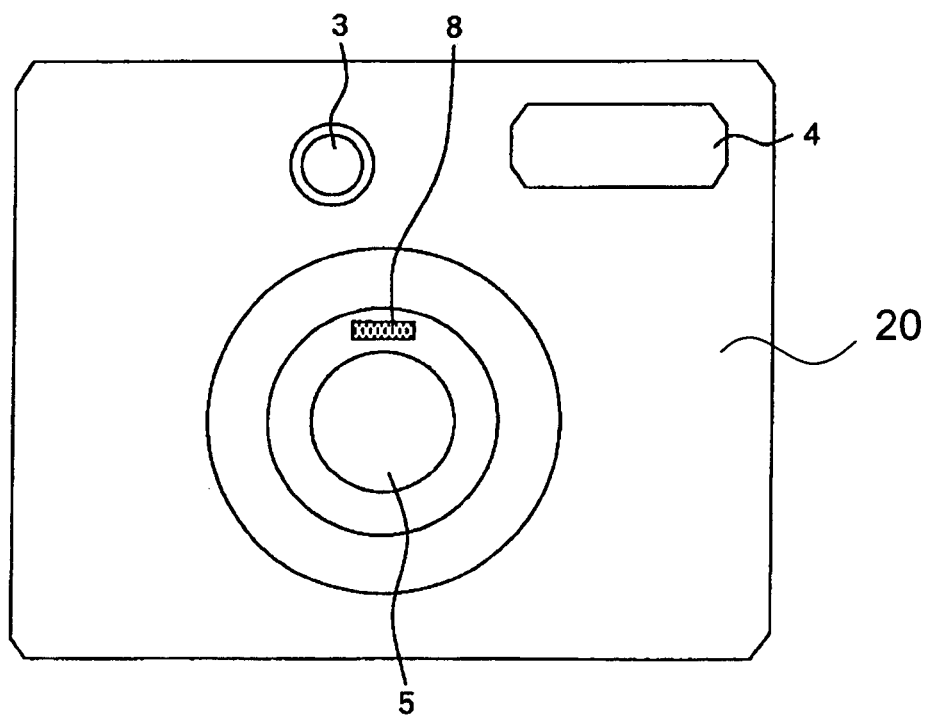

FIG. 1 is a front perspective view of a digital camera which is Embodiment 1 of the present invention. FIGS. 2 and 3 are section views of the digital camera taken along a dashed line A in FIG. 1. FIG. 2 shows the camera when a barrel is collapsed, while FIG. 3 shows the camera when the barrel is extended outward. FIGS. 4 and 5 are sections view of the digital camera taken along a dashed line B in FIG. 1. FIG. 4 shows the camera when the barrel is collapsed, while FIG. 5 shows the camera when the barrel is extended outward. FIGS. 7 and 8 are front views of the digital camera when the lens barrel is at different positions.

Figure 22:
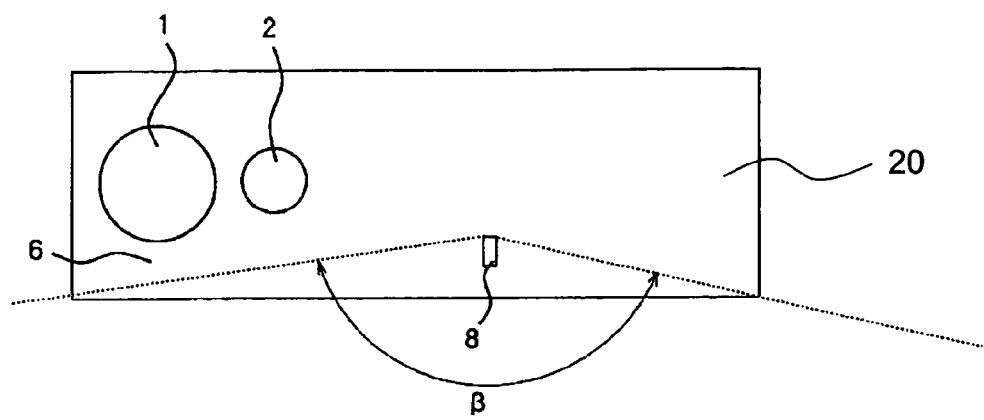
FIG. 22 is a top view of the camera for showing RF signals when a barrel is collapsed in Embodiment 1.
Figure 23:
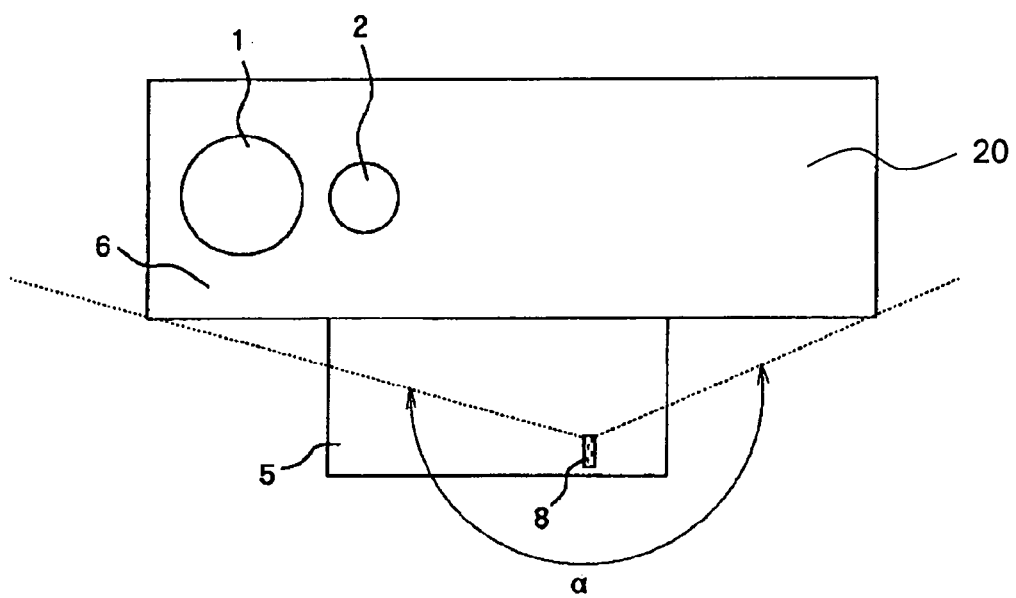
FIG. 23 is a top view of the camera for showing RF signals when images can be taken in Embodiment 1.

FIG. 22 shows the digital camera in FIG. 1 viewed from the top when the barrel is collapsed. FIG. 23 shows the digital camera in FIG. 1 viewed from the top when it takes an image.

In these figures, reference numeral 1 shows a power switch which is provided on the top of a camera body 20. Reference numeral 2 shows a release button which is provided adjacent to the power switch 1. Reference numeral 3 shows an optical viewfinder for an operator to observe an object. Reference numeral 4 shows an illumination unit which applies flash light to the object in taking images. Reference numeral 5 shows a lens barrel (a movable portion) which can be retracted in (collapsed) and projected from the camera body 20 and achieves zooming and focusing by moving forward and backward in an optical axis direction while it is projected. Reference numeral 8 shows an antenna for performing wireless communication. Energy supply to the antenna 8 is performed through a cable 81 shown in FIGS. 4 and 5.

Reference numeral 51 shows a first lens unit disposed in the lens barrel 5, 52 a second lens unit, 53 a holding barrel which holds the first lens unit 51 and the second lens unit 52, 54 a fixed barrel, and 55 a photoelectrical conversion image-pickup device (for example, a CCD sensor or a CMOS sensor).

Next, the internal structure of the digital camera in Embodiment 1 will be described with reference to FIG. 6.

Figure 6:
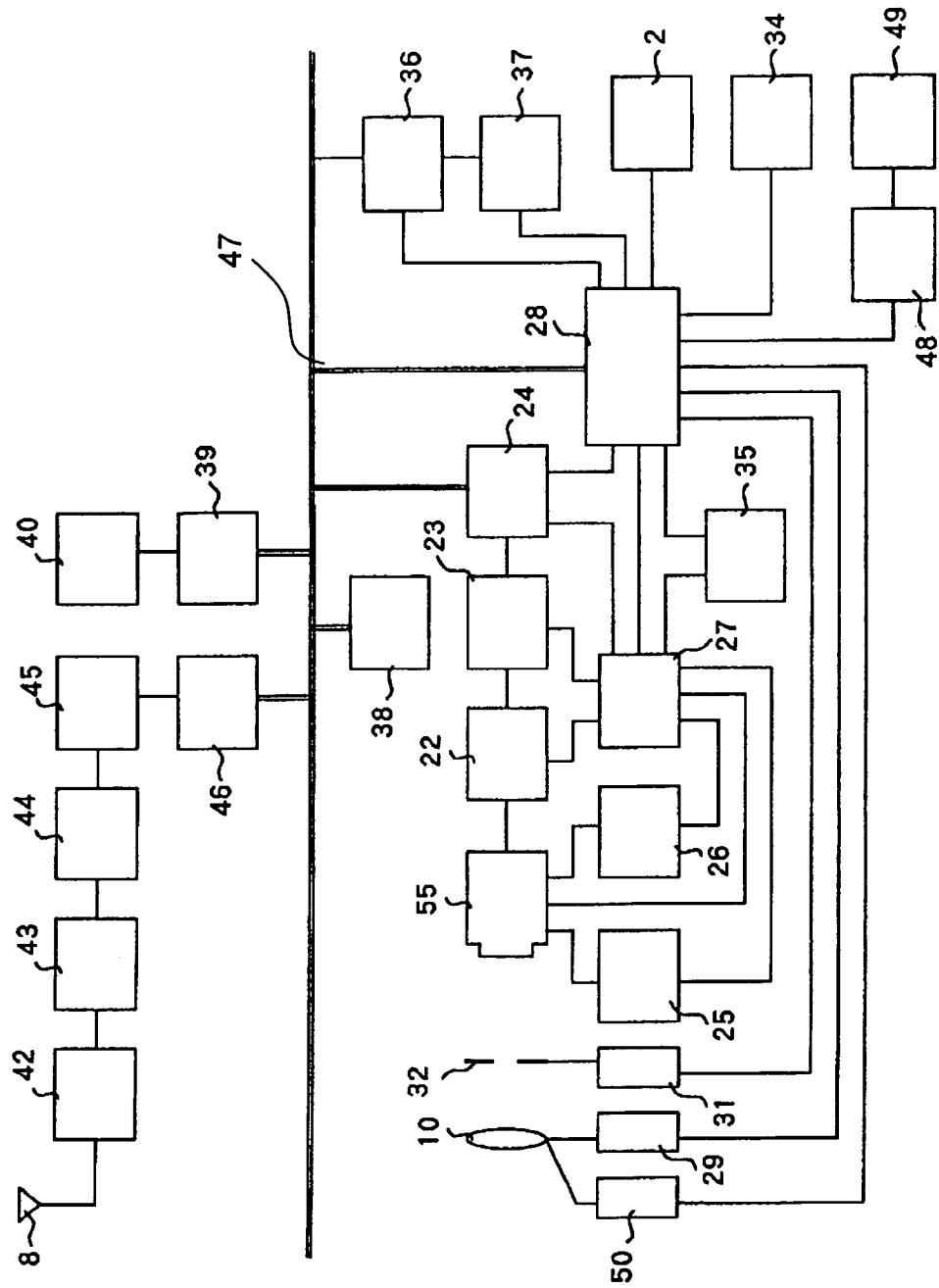
FIG. 6 is a block diagram showing the structure of the camera in Embodiment 1.

In FIG. 6, reference numeral 22 shows a correlated dual sampling circuit (hereinafter referred to as a "CDS circuit") for converting an output signal from the photoelectrical conversion device 55 into a video signal. Reference numeral 23 shows an analog-digital conversion circuit (hereinafter referred to as an "AD circuit") which converts an analog signal output from the CDS circuit 22 into a digital signal.

Reference numeral 24 shows a digital signal processing circuit (hereinafter referred to as a "DSP circuit") which performs various types of signal processing such as color signal processing and luminance signal processing. Reference numeral 25 shows a horizontal transfer driving circuit (hereinafter referred to as an "HDr circuit") for driving a horizontal transfer portion of the photoelectrical conversion device 55. Reference numeral 26 shows a vertical transfer driving circuit (hereinafter referred to as a "VDr circuit") for driving a vertical transfer portion of the photoelectrical conversion device 55.

Reference numeral 27 shows a timing generator (hereinafter referred to as a "TG") which receives a reference synchronization signal and uses the reference signal to generate various pulses necessary for the driving of the photoelectrical conversion device 55 and the signal processing. Reference numeral 28 shows a controller which is responsible for the overall control of the digital camera. Reference numeral 29 shows a lens driving circuit for driving a focus lens 10.

Reference numeral 31 shows an aperture driving circuit for driving an aperture and a shutter. Reference numeral 32 shows an aperture and shutter for controlling an amount of light incident on the photoelectrical conversion device 55 and controlling an exposure time. Reference numeral 34 shows an operation member formed of various switches. Reference numeral 35 shows a reference signal producing circuit which has a crystal oscillator circuit and produces a main clock, a horizontal synchronizing signal (hereinafter referred to as an "HD"), and a vertical synchronizing signal (hereinafter referred to as a "VD") to operate the controller 28 and the TG 27.

Reference numeral 36 shows an LCD driver circuit (hereinafter referred to as an "LCDDr circuit") for driving an LCD 37. Reference numeral 37 shows the display (realized by a liquid crystal display in this case and hereinafter referred to as the "LCD") for monitoring an object image and reproducing and displaying a recorded image, and 38 an internal memory for temporarily storing data.

Reference numeral 39 shows an interface circuit for transmitting and receiving data to and from an external memory, 40 a removable memory for storing image data, 42 an RF transmission/reception circuit which transmits and receives RF signals, 43 an RF/IF conversion circuit for conversion from an RF to an intermediate frequency and from an intermediate frequency to an RF, 44 a baseband processing circuit which performs signal processing at a fundamental frequency, 45 a MAC (Media Access Control) controller for conversion from image data of JPEG format or the like into packet data or from packet data into image data, 46 an interface circuit for transmitting and receiving data to and from the MAC controller 45, 47 a data bus line through which data is passed, 48 an audio amplifier circuit which performs audio signal processing, 49 a speaker which converts an electric signal into an audio signal, and 50 a lens barrel driving circuit for driving the lens barrel.

Next, the operation of the digital camera will be described. When the operation member 34 (the power switch 1) is operated to turn on the camera and an image-taking mode is selected, the lens barrel driving circuit 50 drives the lens barrel 5 to project forward from the camera body 20 in the optical axis direction to enter the state in which images can be taken.

An object image is transmitted through the image-taking lens 10 and its light amount is adjusted by the aperture and shutter 32 before focusing on the imaging surface of the image-pickup device 55 as the object image. The object image is photoelectrically converted by the image-pickup device 55 into an electrical signal which is output to the CDS 22 as an imaging signal. The main clock, the HD, and the VD produced in the reference signal producing circuit 35 are output to the TG 27 which then uses these signals to generate a horizontal transfer pulse, a vertical transfer pulse, a field shift pulse, an electronic shutter pulse, and an OB clamp pulse. Then, the horizontal transfer pulse is output to the HDr circuit 25. The vertical transfer pulse, the field shift pulse, and the electronic shutter pulse are output to the VDr circuit 26, and the OB clamp pulse is output to the CDS circuit 22. Based on the vertical transfer pulse and the field shift pulse output from the TG 27, the VDr circuit 26 combines and converts them into a ternary (H (high potential), M (middle potential), and L (low potential) levels) signal having a signal amplitude and a frequency characteristic adequate for driving the vertical transfer portion of the image-pickup device 55, and outputs that signal to the vertical transfer driving portion of the image-pickup device 55. With these signals, the image-pickup device 55 outputs charge accumulated in photodiodes of the image-pickup device 55 to the vertical transfer portion when an "H" level signal corresponding to the field shift pulse is input. The charge output to the vertical transfer portion is transferred sequentially on a vertical transfer path to a horizontal transfer path in bucket brigade with quaternary binary (M and L levels) driving of the vertical transfer pulse.

After the electronic shutter pulse is converted in the VDr circuit 26 to have a signal amplitude adequate for driving the image-pickup device 55, it is output to the image-pickup device 55 to control a charge accumulation time (an exposure amount) in the image-pickup device 55. The image-pickup device 55 continues clearing the charge in the photodiodes while the electronic shutter pulse is input, and starts exposure immediately after the electronic shutter pulse is stopped.

The exposure is finished by driving the aperture and shutter 32 in a close direction to shut off the incidence of external light. The HDr circuit 25 converts the horizontal transfer pulse output from the TG 27 into a signal having a signal amplitude and a frequency characteristic adequate for driving the horizontal transfer portion of the image-pickup device 55, and outputs that signal to the horizontal transfer portion of the image-pickup device 55. A reset gate pulse is directly output to the image-pickup device 55 from the TG 27 to fix the potential of an output gate portion of the image-pickup device 55 at a certain level for charge/potential conversion.

In response to the horizontal transfer pulse and the reset gate pulse signal, the image-pickup device 55 outputs the charge from the horizontal transfer portion through an output amplifier to the CDS circuit 22 as the imaging signal converted from the object image.

The CDS circuit 22 produces a video signal based on the level difference between a field through part and a data part in the imaging signal input thereto. This can remove low-frequency noise included in the imaging signal. The CDS circuit 22 re-sets a reference part in the signal (for some of the photodiodes in the image-pickup device 55 shielded from light (hereinafter referred to as an "OB part")) to a new DC bias (DC restoration, hereinafter referred to as "clamp"), amplifies the video signal through a variable gain amplifying function to provide desired sensitivity, and outputs the signal to the AD circuit 23. A dummy signal portion for part of the image-pickup device 55 with no photodiode may be used as the above mentioned signal reference part.

The AD circuit 23 converts the video signal output from the CDS circuit 22 from analog to digital form (for example, a 10-bit signal) and outputs it to the DSP circuit 24. The output from the AD circuit 23 is set such that the above mentioned OB part always has a fixed value (for example, 32 LSB in a full range of 1024 LSB). Thus, the video signal is represented between 32 and 1023 LSB.

The DSP circuit 24 performs signal processing on the digital signal input as the video signal to reproduce the luminance signal and the color signal. It also uses the video signal to produce an exposure reference signal for performing exposure control, a white balance reference signal for performing white balance control, and a focus reference signal for performing focus control.

The image data processed in the DSP circuit 24 is temporarily stored in the internal memory 38 through the data bus line 47. The image data is also converted by the DSP circuit 24 into a display data signal for display on the LCD 37 (typically in the form of R, G, and B, or Y, RY, and BY) and input to the LCDDr circuit 36. The LCDDr circuit 36 converts the display data signal into data suitable for display on the LCD 37 (for example, conversion into R, G, and B signals) to have a signal amplitude for allowing optimal driving of the LCD 37, and outputs it to the LCD 37.

Then, the operator presses the release button switch 2 halfway to start image-taking preparatory operation such as focus control and exposure control. The operator determines the composition while monitoring the object image displayed on the LCD 37. Then, when the operator fully presses the release button 2, the image-taking operation can be started to take a still image at that point.

In the image-taking operation, the DSP circuit 24 performs signal processing on the video signal converted into the digital signal to reproduce the luminance signal and the color signal and temporarily stores them in the internal memory 38. Then, the DSP circuit 24 converts the image data read from the internal memory 38 into reversible or irreversible image coded data (which herein means general data of JPEG file format and is hereinafter referred to as "JPEG data") and stores it as a JPEG file in the removable memory 40 (for example, a CF card or a SD card) through the interface circuit 39.

When the image file is transmitted to another communication apparatus with a wireless LAN, the JPEG image stored in the removable memory 40 is transmitted to the MAC controller 45 through the interface circuit 39, the data bus line 47, and the interface circuit 46 in accordance with the IEEE Std 802.11, and the coded JPEG data or the like is converted into packet data. Then, transmission signal processing is performed such as assembly or disassembly of a frame for wireless transmission, production of a control frame, taking and control of a wireless communication channel, and control of the communication speed.

The data in frame is transmitted to the baseband processing circuit 44 and modulated before transmission to the RF/IF conversion circuit 43. The RF/IF conversion circuit 43 performs filtering and phase modulation of the signal at an intermediate frequency (hereinafter abbreviated as "IF") for transmission and outputs the signal to the RF transmission/reception circuit 42. After the IF signal is converted into a signal at a radio frequency ("RF") and amplified at a predetermined amplification factor, it is transmitted to the other communication apparatus from the antenna 8.

In contrast, when an image file is received from another communication apparatus with a wireless LAN, an RF signal is received at the RF transmission/reception circuit 42 through the antenna 8 in accordance with the IEEE Std 802.11. The received RF signal is converted into an IF signal in the RF/IF conversion circuit 43 which performs filtering and phase modulation on the IF signal for reception. The signal output from the RF/IF conversion circuit 43 is transmitted to the baseband processing circuit 44 and subjected to decoding for extraction as packet data before output to the MAC controller 45. The packet data is converted into data in a final file format such as JPEG data. The received JPEG image data is transmitted to and stored in the removable memory 40 from the MAC controller 45 through the interface circuit 46, the data bus line 47, and the interface circuit 39.

Next, description will be made of the procedure of transmission and reception between the camera in Embodiment 1 and a printer with a communication function. It is assumed that the camera and the printer are disposed in a communication range thereof. Instead of the printer, a computer or a storage device such as a hard disk with a communication means may be used.

First, the operation member 34 (the power switch 1) is operated to turn on the digital camera. The digital camera has at least an image-taking mode, a reproduction mode, and a communication mode. The communication mode includes a still image transfer mode for transferring a still image file after image-taking to a printer through a wireless LAN and a live image transfer mode for transferring a live image during image-taking.

When a mode selection dial forming part of the operation member 34 is operated to select the communication mode, the lens barrel driving circuit 50 in FIG. 6 applies torque to the barrel driving motor (for example, a stepping motor or a vibration wave motor) to cause the holding barrel 53 in FIG. 2 to move forward in the optical axis direction by a predetermined moving amount D relative to the fixed barrel 54. The holding barrel 53 is made of a mold member, and the fixed barrel 54 and the holding barrel 53 engage through a cam and a cam follower formed therefor. When the holding barrel 53 receives the driving force of the barrel driving motor and starts to rotate about the optical axis, the holding barrel 53 moves forward and backward in the optical axis direction with the cam engagement of the holding barrel 53 and the fixed barrel 54. The predetermined moving amount D, which is the moving amount of the holding barrel 53, is preferably set to a value optimal for the sensitivity and directivity of the antenna in view of the specifications and the exterior shape thereof.

The lens barrel may be driven with the method disclosed in Japanese Patent Application Laid-Open No. 2002-14271 or Japanese Patent Application Laid-Open No. 2003-195146.

Next, the arrangement of the antenna 8 in Embodiment 1 will be described. The antenna 8 is mounted in the end of the lens barrel 5 (the end in the optical axis direction) on the section along the dashed line B shown in FIG. 1. As shown in FIG. 4, the antenna 8 is disposed inside the camera body 20 when the lens barrel 5 is collapsed, while it is disposed outside the camera body 20 when the lens barrel 5 is driven to enter the state in which images can be taken as shown in FIG. 5.

The energy supply to the antenna 8 is performed with the cable 81 made of an elastic member which can expand and contract in the optical axis direction. According to the above-mentioned structure, the lens barrel 5 is driven to move the antenna 8 provided in the end of the lens barrel 5 (the end of the holding barrel 53) forward and backward in the optical axis direction and to expand and contract the cable 81 following the position of the antenna 8. In the image-taking mode, the energy supply to the antenna 8 is stopped, while in the communication mode, the energy supply to the antenna 8 is performed.

The camera has numerous metal components incorporated therein such as a mounting board as an electric component and a shield case of the mounting board, and the camera exterior may be made of metal. For radio waves in an RF band, these metal components may serve as reflecting members to adversely affect the directivity of the RF signals. In Embodiment 1, the antenna 8 is disposed in the end of the lens barrel 5, so that the antenna 8 can be moved to a position away from the camera body 20 by driving the lens barrel 5 to enter the state in which images can be taken, that is, moving it forward in the optical axis direction. This can provide a stable communication function of the camera. The antenna 8 is disposed to extend in the direction substantially orthogonal to the longitudinal direction of the lens barrel 5.

Next, description will be made of the behavior of radio waves output from the antenna 8 with reference to FIGS. 4, 5, 22, and 23. FIGS. 4 and 22 show the behavior of radio waves when the lens barrel is collapsed, while FIGS. 5 and 23 show the behavior of radio waves when the lens barrel takes an image.

When the antenna 8 is supplied with energy with the lens barrel 5 retracted in the housing area within the camera body, an RF signal output from the antenna 8 propagates in an angular range β (β is smaller than 180 degrees) as shown in FIGS. 4 and 22. It is unnecessary that β shown in FIG. 4 is always the same as β shown in FIG. 22.

On the other hand, when the antenna 8 is supplied with energy with the lens barrel 5 driven to the outside of the camera body 20, an RF signal output from the antenna 8 propagates in an angular range α (equal to or larger than 180 degrees) larger than the angle β as shown in FIGS. 5 and 23. It is unnecessary that α shown in FIG. 5 is always the same as α shown in FIG. 23.

In other words, the arrangement of the antenna 8 in the end of the lens barrel 5 as in Embodiment 1 can provide radio waves in a wide range in the state in which images can be taken (the image-taking state or image-taking preparatory state).

Next, the characteristic of a horizontally polarized wave and a vertically polarized wave will be described. FIGS. 7 and 8 are front views of the digital camera and show the lens barrel 5 at different positions about the optical axis. The antenna 8 is mounted inside the lens barrel 5, but FIGS. 7 and 8 show the antenna 8 projected on the front of the lens barrel 5.

The antenna 8 can be fixed to the position shown in FIG. 7 or 8 depending on the position (the rotational position) of the lens barrel 5. The direction of the antenna 8 can be adjusted by storing a predetermined position of the antenna 8 and rotating the lens barrel 5 for that position. Thus, the direction of the antenna 8 can be adjusted such that the received signal is detected with the optimal (maximum) received state (sensitivity).

Due to the mounting method of an antenna on the partner side to communicate with, the antenna 8 may output nonuniform radio waves with unevenness in the horizontal direction (horizontally polarized wave) and the vertical direction (vertically polarized wave). In this case, the direction of the antenna 8 can be changed to achieve ideal reception on the reception side in accordance with the intensity of the horizontally polarized wave or vertically polarized wave. It is possible to communicate while the lens barrel 5 is collapsed depending on the reception state.

Embodiment 2

Description will be made of a digital camera which is Embodiment 2 of the present invention with reference to FIGS. 9 to 13. Components identical to those in Embodiment 1 are designated with the same reference numerals as those in Embodiment 1. The electrical structure in Embodiment 2 is basically the same as the structure described in FIG. 6.

Figure 9:
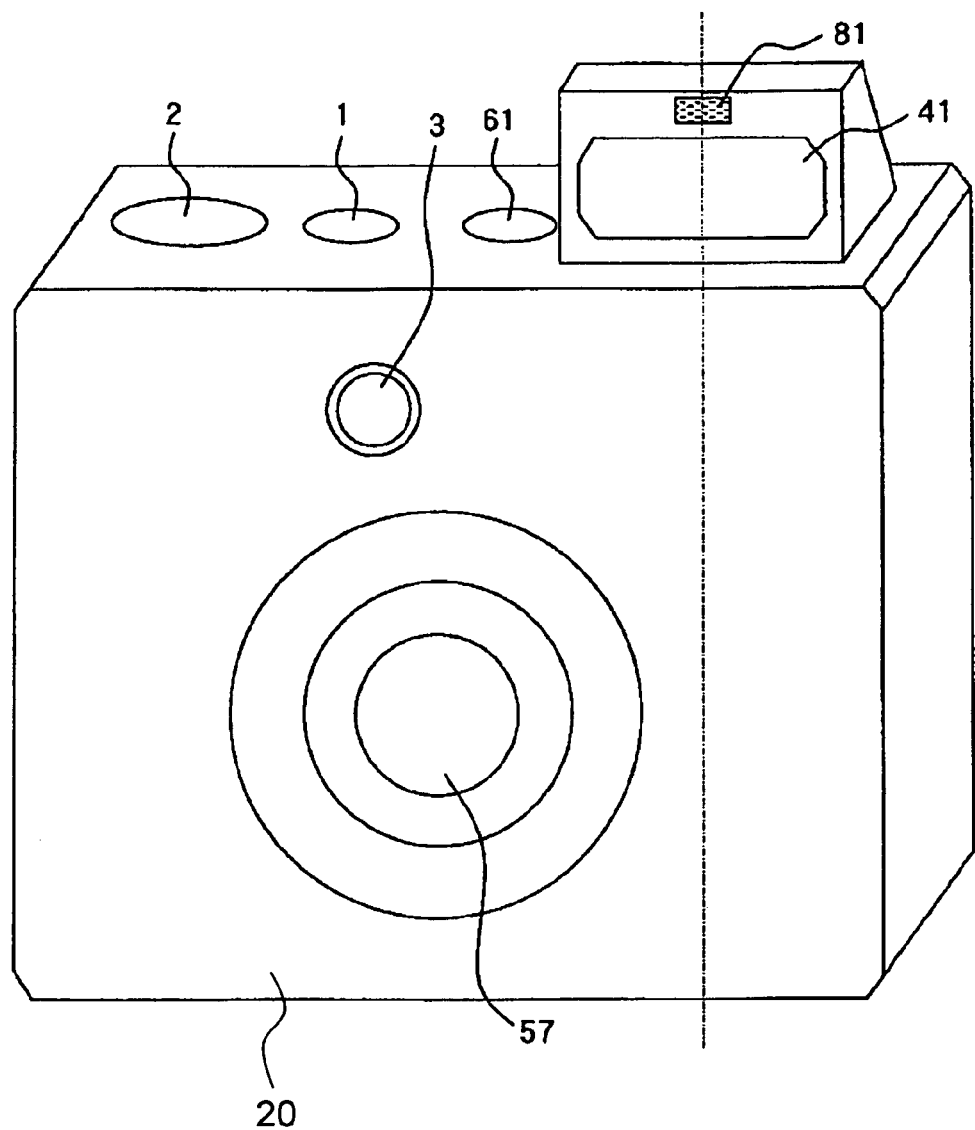
FIGS. 9 and 10 show the outer appearance of a camera which is Embodiment 2 of the present invention.
Figure 10:
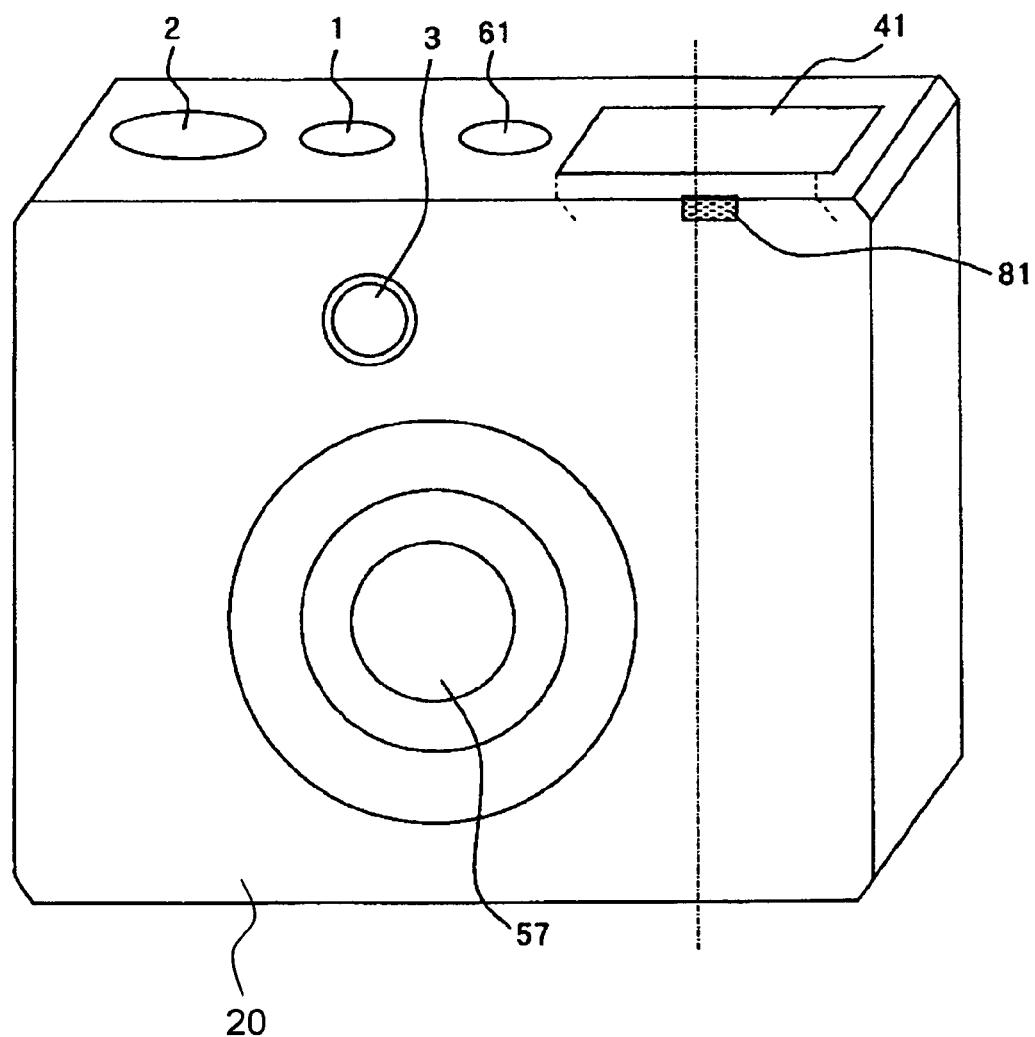
Figure 11:
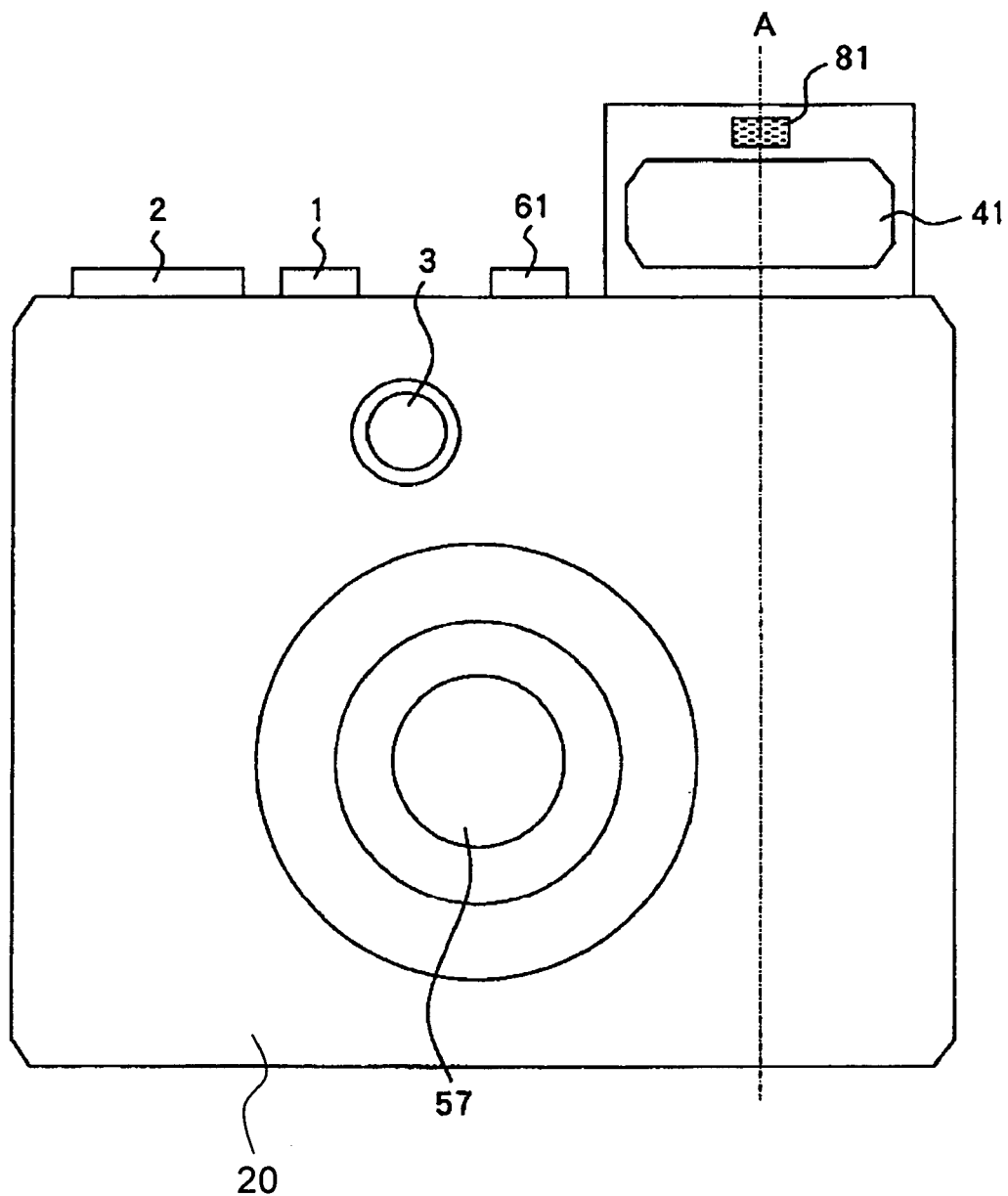
FIG. 11 is a front view of the camera in Embodiment 2.
Figure 12:
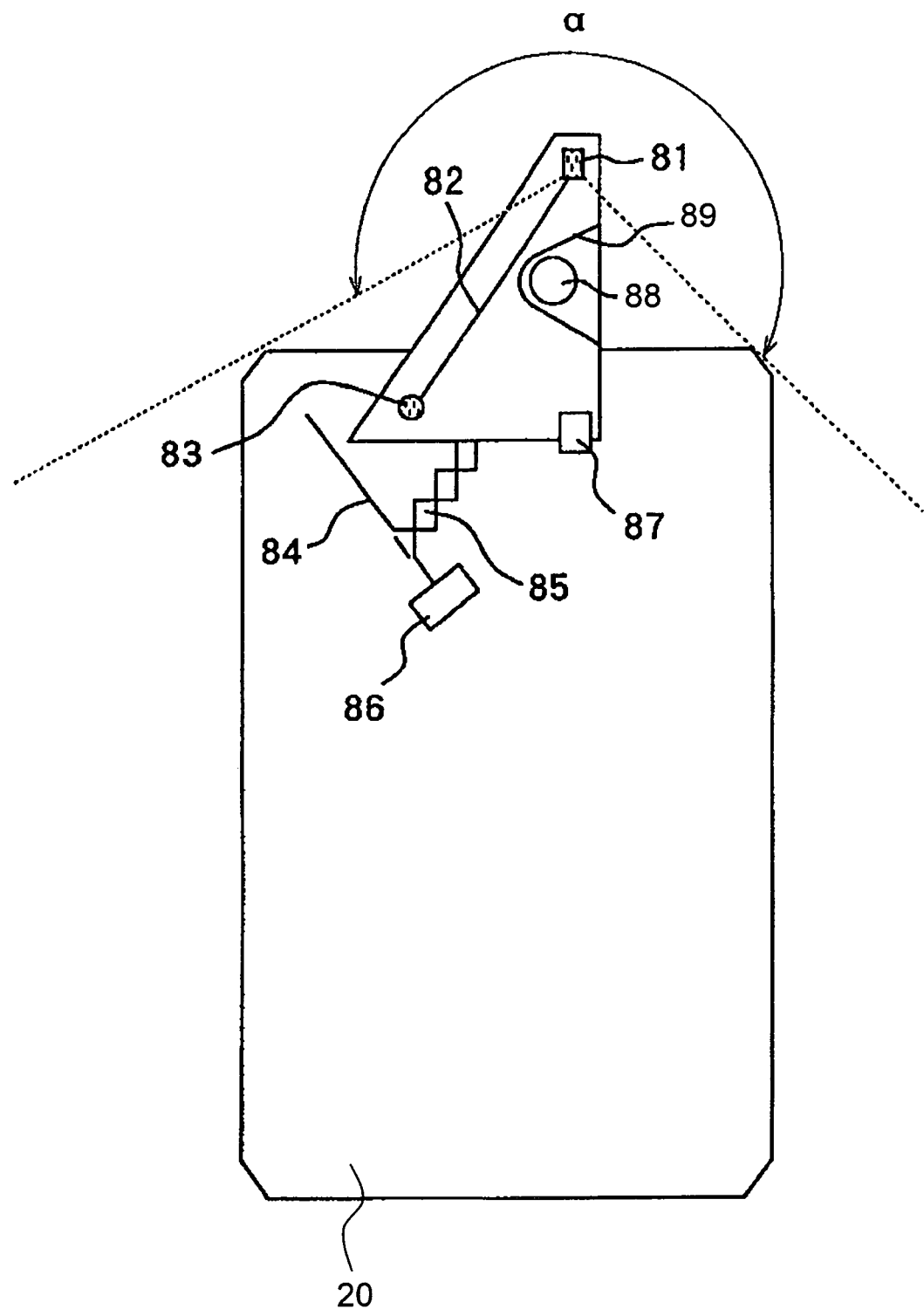
FIGS. 12 and 13 are section views of the camera in Embodiment 2.
Figure 13:
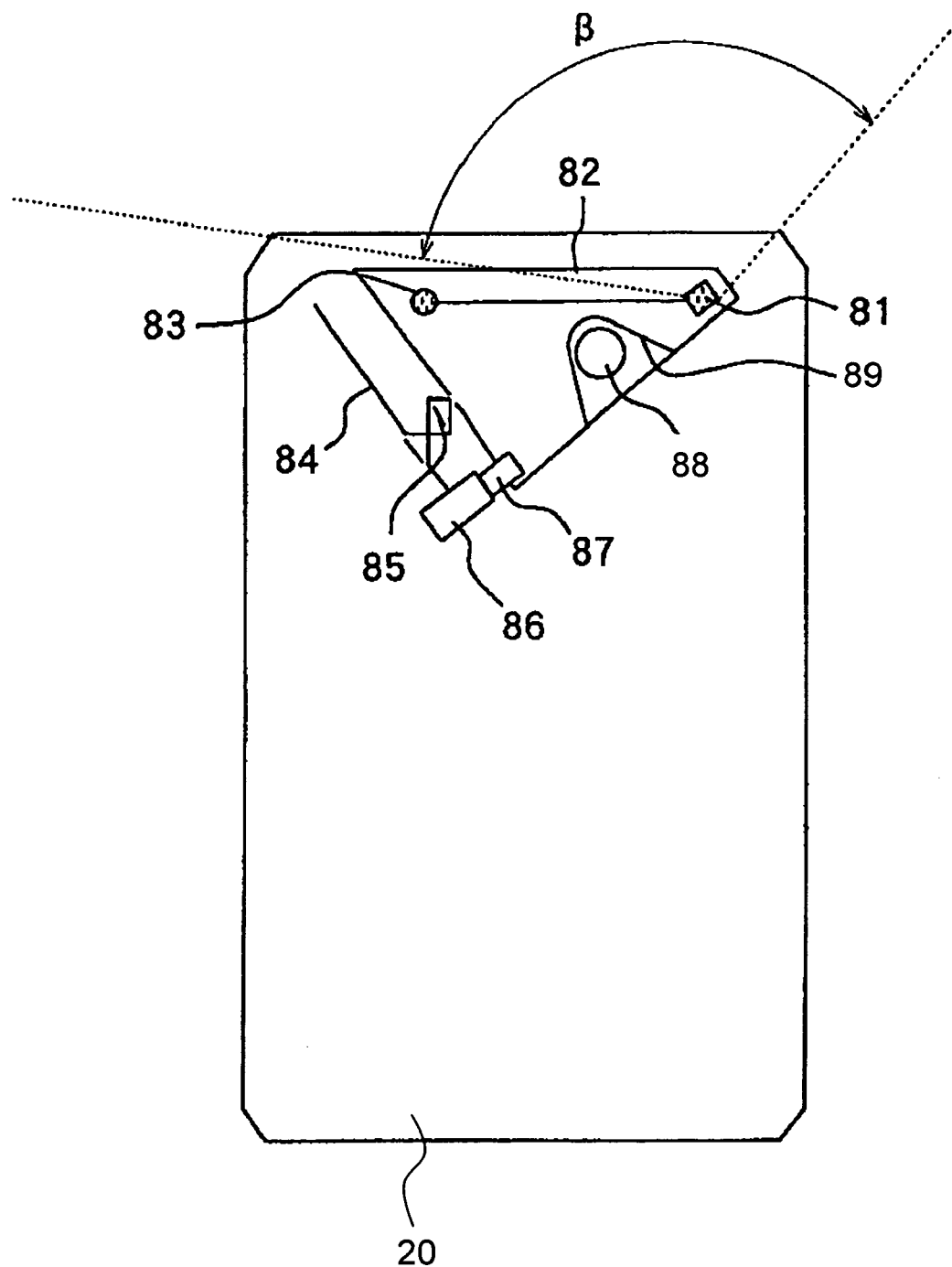

In Embodiment 2, a light-emitting unit (a movable portion) 41 which illuminates an object for image-taking is projected from and retracted in a camera body 20. FIG. 9 shows the digital camera when the light-emitting unit 41 which applies flash light to the object is driven in the projecting direction from the camera body 20. FIG. 10 shows the digital camera when the light-emitting unit 41 is retracted in the camera body 20. FIG. 11 is a front view of the digital camera in Embodiment 2. FIG. 12 is a sectional side view of the digital camera when the light-emitting unit 41 is driven to project. FIG. 13 is a sectional side view of the digital camera when the light-emitting unit 41 is retracted in the camera body 20. While FIGS. 9 to 13 show an antenna 81 projected on the front of the light-emitting unit 41 or the camera body 20, the antenna 81 is actually mounted inside an upper portion of the light-emitting unit 41.

Reference numeral 57 shows a lens barrel and 61 a light-emitting mode switch for switching between ON/OFF of the light-emitting unit 41.

Next, the operation of the digital camera in Embodiment 2 will be described. First, a power switch 1 in FIG. 9 is pressed to turn on the digital camera. The camera has an image-taking mode, a reproduction mode, and a communication mode. The communication mode includes a still image transfer mode for transferring a still image file after image-taking to another communication terminal through a wireless LAN and a live image transfer mode for transferring a live image during image-taking. When the image-taking mode is selected by operating a mode selection dial (not shown) forming part of an operation member 34 as shown in FIG. 6, a lens barrel driving circuit 50 applies torque to a barrel driving motor to drive a holding barrel 53 as in FIG. 2 forward in the optical axis direction as described in Embodiment 1. The holding barrel 53 projects to the front of the camera body 20 as shown in FIG. 3.

When the image-taking mode is selected, the lens barrel driving circuit 50 drives the lens barrel 57 forward in the optical axis direction to enter the state in which images can be taken. When the image-taking mode is set, a user operates the image-taking mode switch 61 to select a light-emitting mode.

In general, an automatic light-emitting mode, a forced light-emitting mode, and a light-emission prohibiting mode can be selected. In the automatic light-emitting mode, underexposure is experienced in normal image-taking when an AE reference signal is lower than a predetermined level in image-taking, so that the camera automatically takes an image with light emission of the light-emitting unit 41. In the forced light-emitting mode, an image is always taken with light emission of the light-emitting unit 41 regardless of the AE reference signal. In the light-emission prohibiting mode, an image is always taken without using the light-emitting unit 41 regardless of the AE reference signal.

Description will be made of the camera operation during the preparation of light emission of the light-emitting unit 41 with reference to FIGS. 12 and 13 in which reference numeral 82 shows a cable for supplying energy to the antenna 81, 83 a rotational axis of the light-emitting unit 41, and 84 a housing reference plane of the light-emitting unit 41.

Reference numeral 85 shows a spring which generates driving force for driving the light-emitting unit 41 in the open direction (the projecting direction), 86 an electromagnet, and 87 a permanent magnet.

Reference numeral 88 shows a xenon tube, and 89 a reflecting umbrella which reflects light emitted backward in the optical axis direction by the xenon tube 88 to the front in the optical axis direction.

As shown in FIG. 13, the light-emitting unit 41 is normally retracted in the camera body 20 before an image is taken. At this point, the permanent magnet 87 and the electromagnet 86 are disposed such that their N poles and S poles are opposite to each other, and current is applied to the coil wound on the electromagnet 86 to generate attracting force. Since the light-emitting unit 41 and the reference plane 84 are coupled to each other through the spring 85 in charge, they are urged in the direction in which they are separated away with the spring force of the spring 85.

However, the magnetic force of the magnets 86 and 87 is stronger than the spring force of the spring 85, so that the magnets 86 and 87 are attracted to each other against the spring force, and the light-emitting unit 41 is held at the housing position within the camera body 20.

Next, reverse current is applied to the coil wound on the electromagnet 86 to reverse the polarity such that the magnets 86 and 87 have the same polarity. This produces the repelling force between the magnets 86 and 87, and in response to the repelling force and the spring force of the spring 85, the light-emitting unit 41 is driven in the projecting direction about the rotational axis 83.

In this manner, the light-emitting unit 41 is automatically driven in the open direction to start the image-taking preparatory operation when the automatic light-emitting mode is selected and the AE reference signal is lower than the predetermined level and when the forced light-emission mode is selected.

When the camera is set to the communication mode, the light-emitting unit 41 is automatically driven to the open position, and the antenna 81 formed in the upper portion of the light-emitting unit 41 is moved from inside the camera body 20. According to the abovementioned structure, the antenna 81 can be driven at the position moved from the camera body 20, so that it is possible to provide a camera with a stable communication function.

In the communication mode, energy is supplied to the antenna 81 through the cable 82, and in the image-taking mode or the reproduction mode, energy supply to the antenna 81 is stopped.

Next, description will be made of the behavior of radio waves transmitted from the antenna 81 with reference to FIGS. 12 and 13. When the antenna 81 is supplied with energy with the light-emitting unit 41 held in the housing position as in FIG. 10, an RF signal transmitted from the antenna 81 propagates in an angular range β (smaller than 180 degrees) as shown in FIG. 13.

When the antenna 81 is supplied with energy with the light-emitting unit 41 held in the projecting position as shown in FIG. 9, an RF signal transmitted from the antenna 81 propagates in an angular range α (equal to or larger than 180 degrees) larger than the angle β as shown in FIG. 12.

In the communication mode, the light-emitting unit 41 may be driven to the projecting position when a received signal is detected and then its reception state (sensitivity) is not optimal (not sufficient).

Embodiment 3

Description will be made of a digital camera which is Embodiment 3 of the present invention with reference to FIGS. 14 to 19. Components identical to those in Embodiment 1 are designated with the same reference numerals as those in Embodiment 1. The electrical structure in Embodiment 3 is basically the same as the structure described in FIG. 6.

Figure 14:
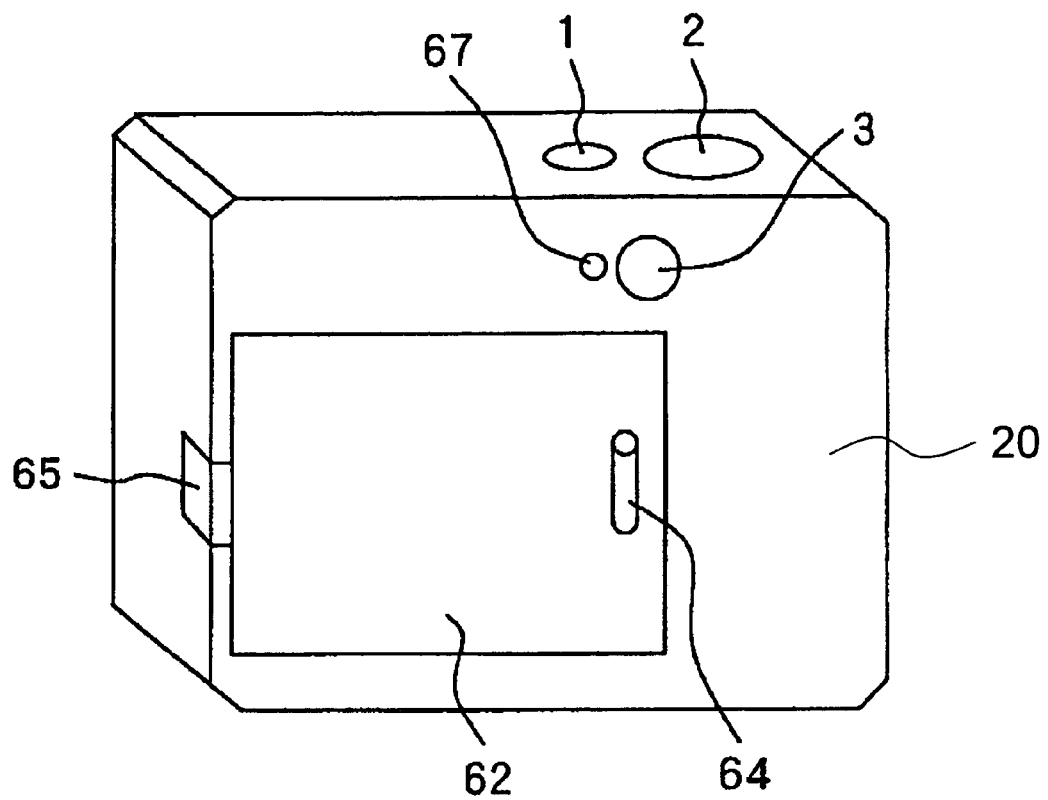
FIGS. 14 to 19 show the outer appearance of a camera which is Embodiment 3 of the present invention.
Figure 15:
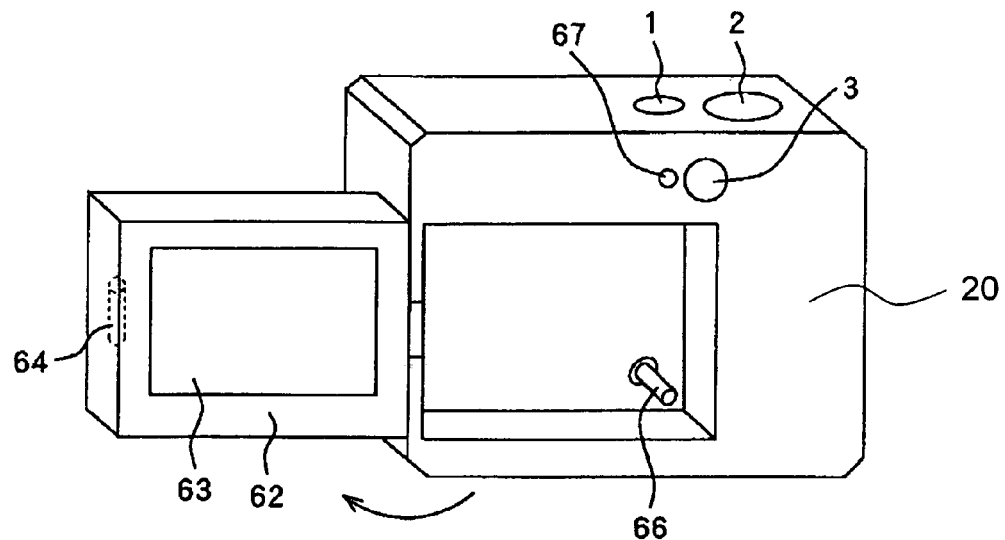
Figure 16:
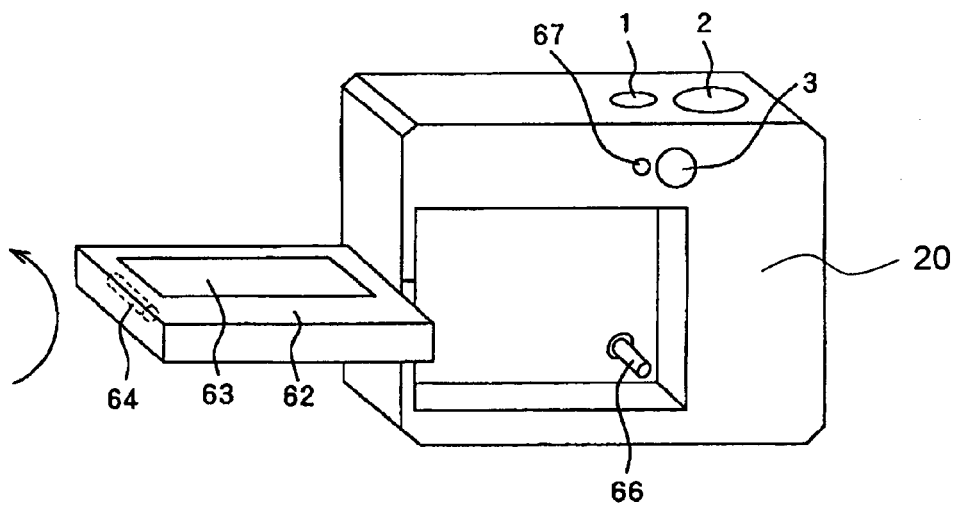
Figure 17:
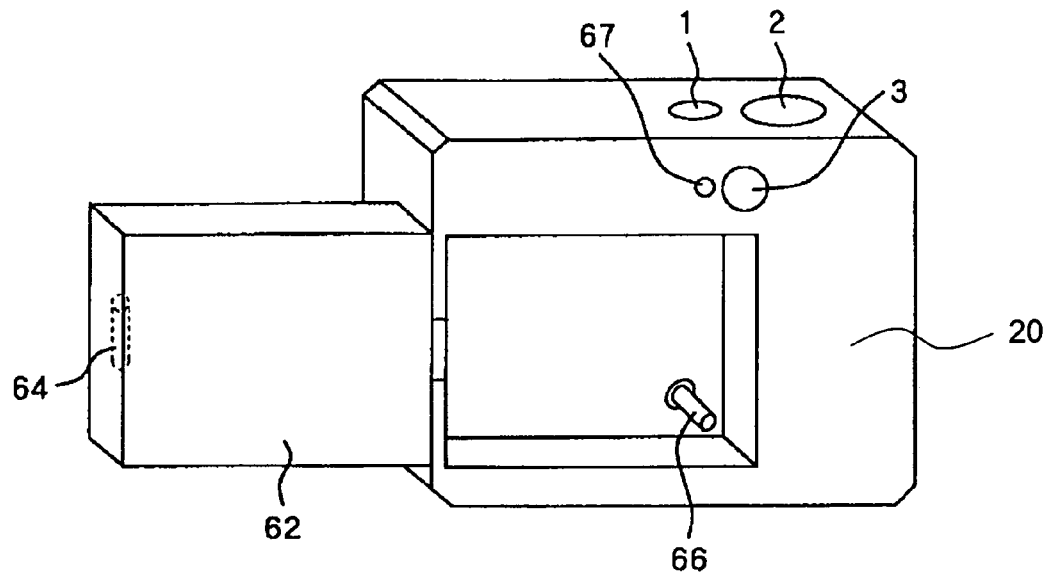
Figure 18:
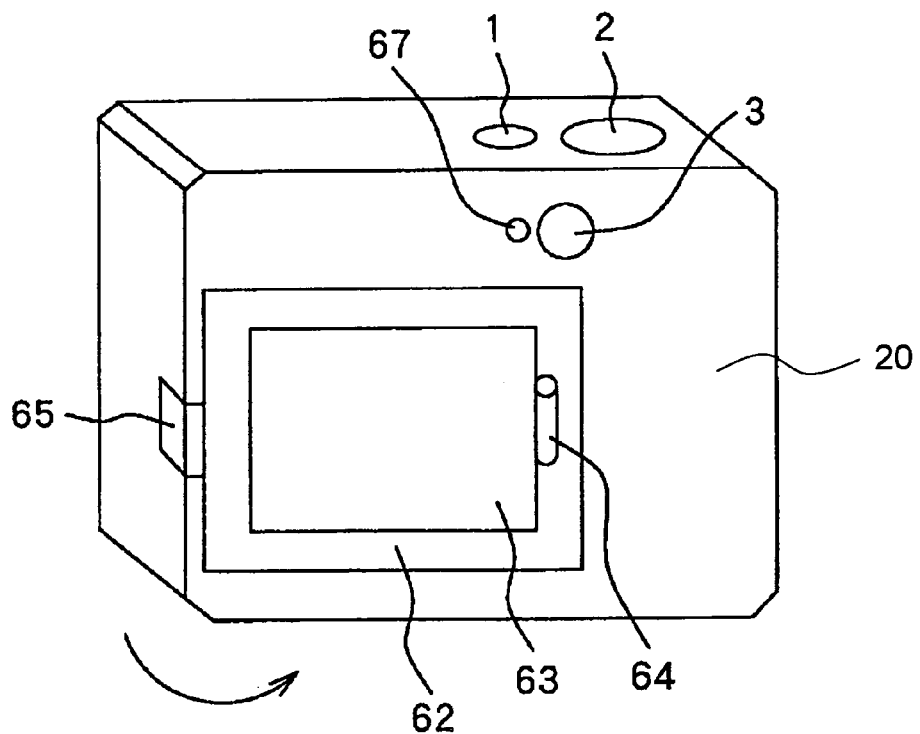
Figure 19:
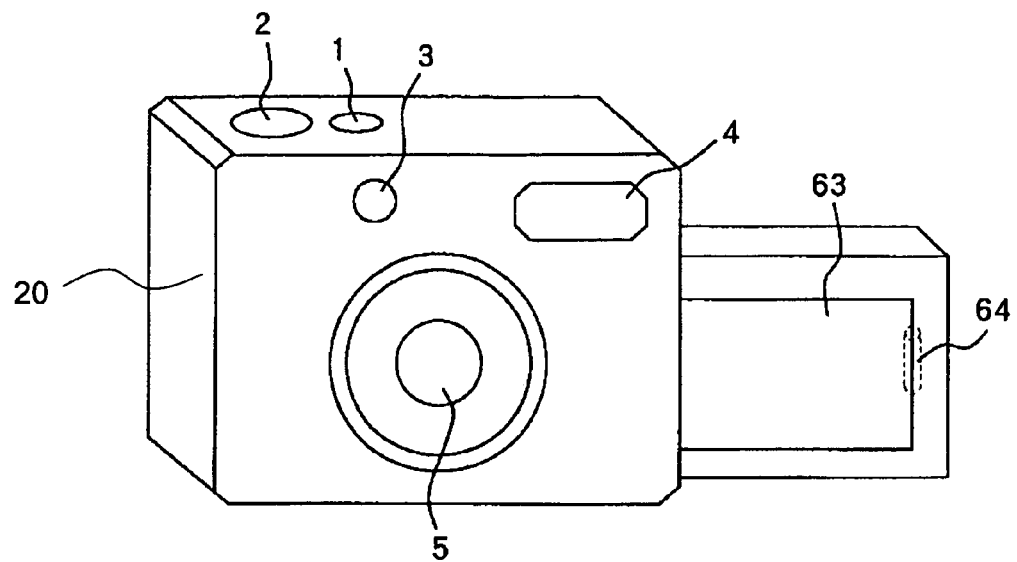
Figure 20:
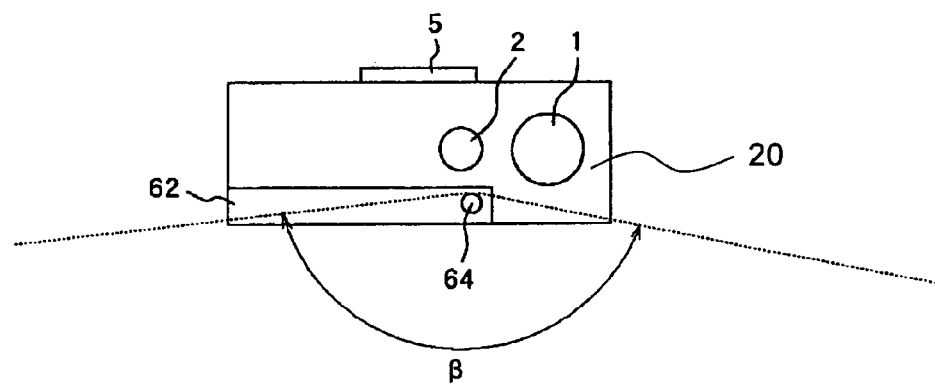
FIGS. 20 and 21A are top views of the camera in Embodiment 3.
Figure 21A:
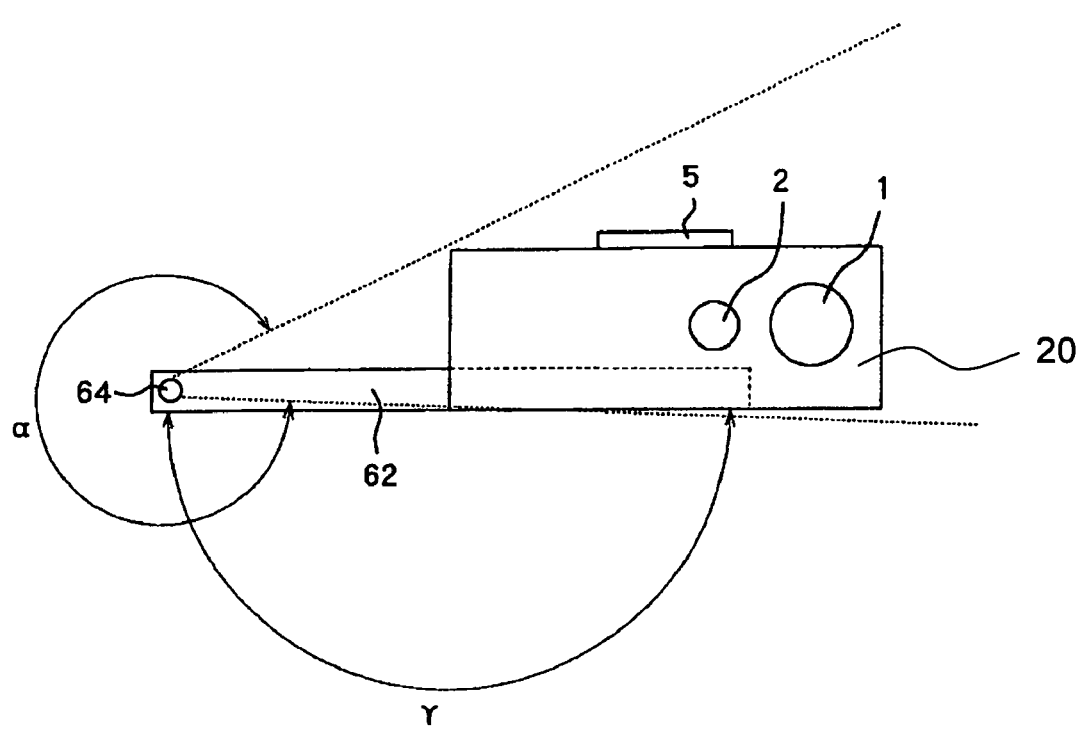
Figure 21B:
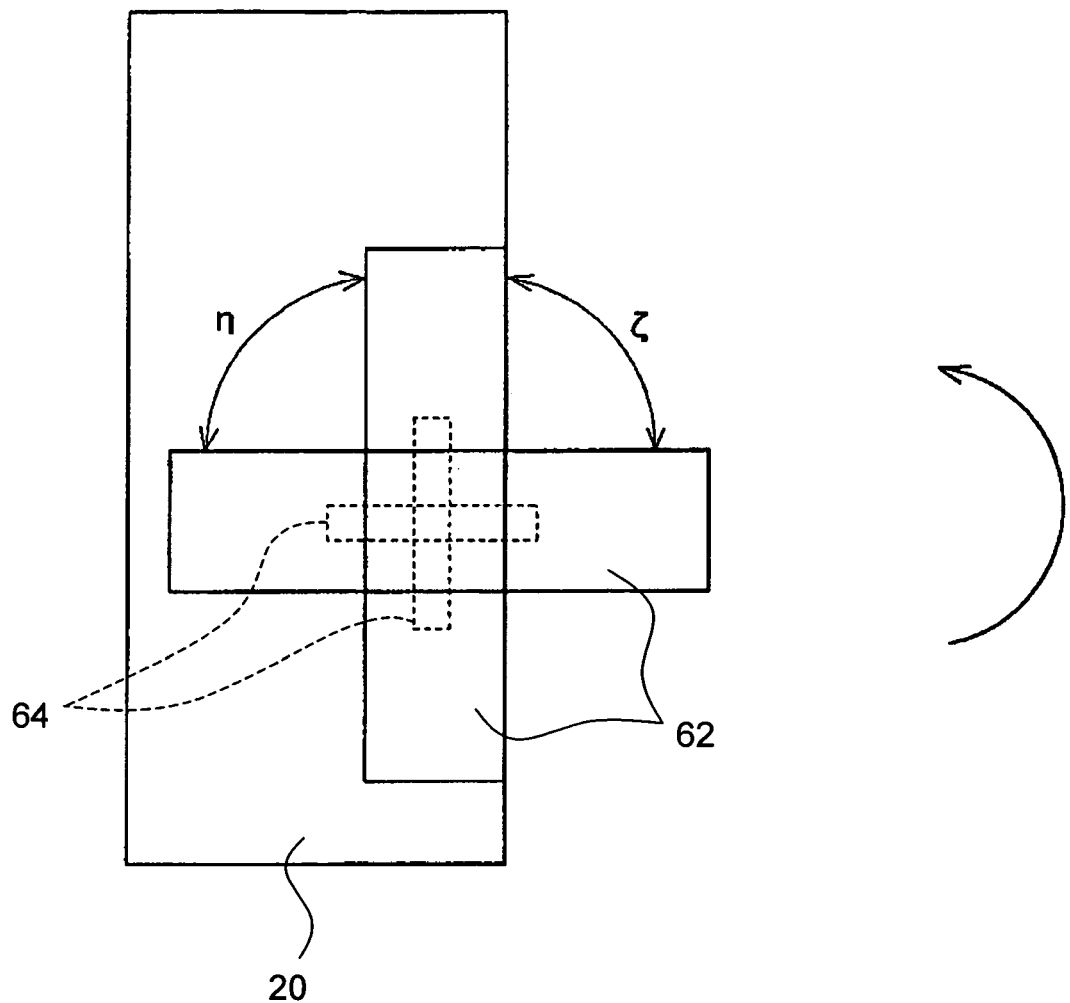
FIG. 21B is a side view of the camera in Embodiment 3.

FIG. 14 shows the digital camera viewed from the back when a variable angle LCD 62 which is a display for observing an object image or an image to be taken is retracted in a camera body 20 with its display surface facing the camera body 20. FIG. 15 shows the digital camera when the variable angle LCD 62 is at a first open position. FIG. 16 shows the digital camera when the variable angle LCD 62 is rotated upward from the first open position in FIG. 15. FIG. 17 shows the digital camera when the variable angle LCD 62 is at a second open position. FIG. 18 shows the digital camera when the variable angle LCD 62 is retracted in the camera body 20 with its display surface facing the outside. FIG. 19 shows the digital camera in FIG. 17 viewed from an image-taking lens. FIG. 20 shows the digital camera viewed from the top in FIG. 14 or 18. FIG. 21A shows the camera in FIG. 15 or 17 viewed from the top. FIG. 21B shows the movement of the variable angle LCD 62 between the first and second open positions.

The variable angle LCD 62 is manually operated. An antenna 64 is actually mounted inside the variable angle LCD 62, but the abovementioned figures show the antenna 64 projected on the ouster surface of the variable angle LCD 62.

The variable angle LCD (a movable portion) 62 includes an LCD display surface 63, the antenna 64, and a hinge member 65 which rotatably couples the variable angle LCD 62 to the camera body 20 about three axes. Reference numeral 66 shows an LCD display open/close detecting switch (hereinafter referred to as a "detection switch"), and 67 an LED formed on the back of the camera body 20.

The variable angle LCD 62 can be opened at 180 degrees with respect to the camera body 20 about the vertical rotational axis of the hinge member 65. In addition, as shown in FIGS. 15, 16, and 17, the variable angle LCD 62 can be rotated at 180 degrees with respect to the camera body 20 about the horizontal rotational axis of the hinge member 65. The detection switch 66 can detect whether the variable angle LCD 62 is opened or closed.

Specifically, it is opened when the detection switch 66 is not pressed by the variable angle LCD 62 as shown in FIGS. 15 to 17 and FIGS. 19 and 21A, while it is closed when the detection switch 66 is pressed by the variable angle LCD 62 as shown in FIGS. 14 and 18. Since such a camera equipped with the variable angle mechanism is disclosed in Japanese Patent Application Laid-open No. 2003-06094, detailed description is omitted.

In Embodiment 3, the antenna 64 is mounted in parallel with the display surface 63 on the opposite side to the hinge member 65 of the variable angle LCD 62 which is the openable/closable display with the variable angle mechanism.

Next, description will be made of the behavior of radio waves output from the antenna 64 with reference to FIGS. 20 and 21A. When the antenna 64 is supplied with energy with the variable angle LCD 62 retracted in the camera body 20, an RF signal output from the antenna 64 propagates in an angular range β (less than 180 degrees) as shown in FIG. 20.

As shown in FIG. 15, when the antenna 64 is supplied with energy with the variable angle LCD 62 at the open position, an RF signal output from the antenna 64 propagates in an angular range α (larger than 180 degrees) larger than the angle β as shown in FIG. 21A.

When the camera is set to a communication mode, the antenna 64 is supplied with energy, while the energy supply to the antenna 64 is stopped in an image-taking mode or a reproduction mode. Since the variable angle LCD 62 is formed to be openable and closable, the position of the antenna 64 can be set such that the received signal is detected with the optimal (maximum) received state (sensitivity). In other words, as shown in FIG. 21A, the variable angle LCD 62 can be freely disposed in an angular range γ. Also, as shown in FIG. 21B, the variable angle LCD 62 can be freely disposed in an angular range η or ζ. Thus, the variable angle LCD 62 can be moved to an ideal position in accordance with the reception state for communication.

As described above, wireless communication can be performed with the variable angle LCD 62 in the open state to ensure an ideal communication state. If a controller (28 in FIG. 6) detects that the variable angle LCD 62 is in the close state while the communication mode is selected, the LCD display surface 63 or the LED 67 is used to display a notice with a text, a mark, or a lamp to prompt a user to open the variable angle LCD 62. This can notify the user to ensure the ideal communication state. The notice is not limited to the display, and the user can be notified with sound by using an audio reproduction means such as the speaker 49 in FIG. 6.

Embodiment 4

Description will be made of a digital camera which is Embodiment 4 of the present invention with reference to FIGS. 24 to 28. Components identical to those in Embodiment 1 are designated with the same reference numerals as those in Embodiment 1. The electrical structure in Embodiment 4 is basically the same as the structure described in FIG. 6.

Figure 24:
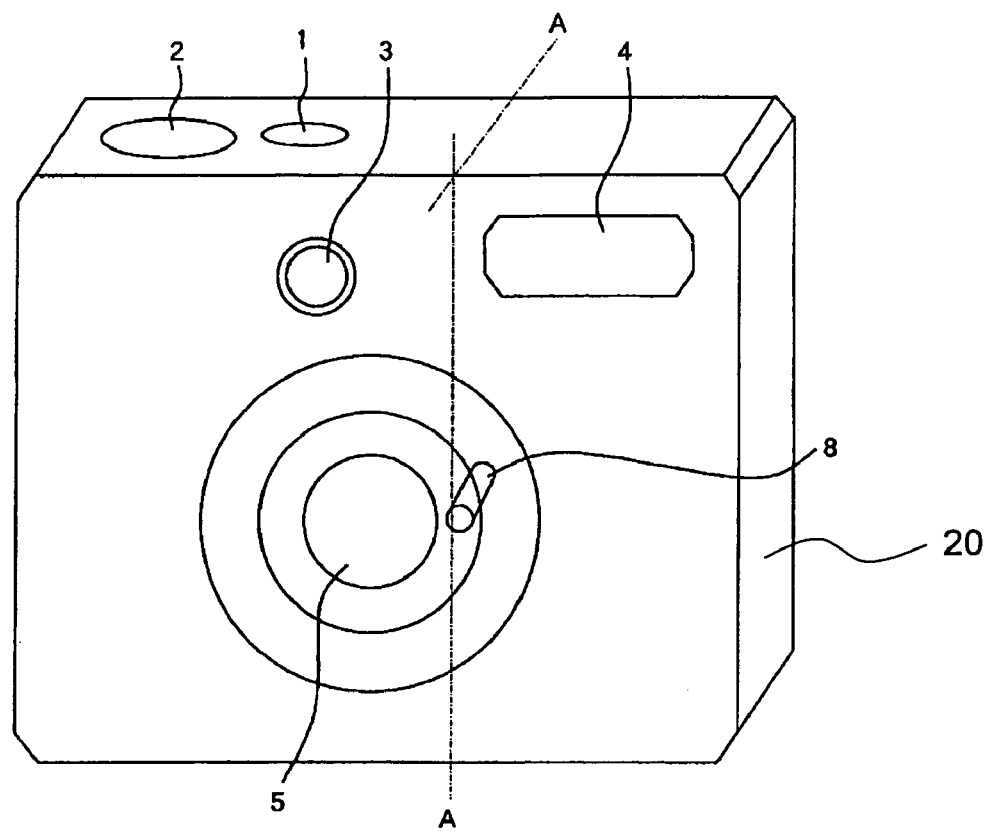
FIG. 24 is a perspective view of a camera which is Embodiment 4 of the present invention.
Figure 25:
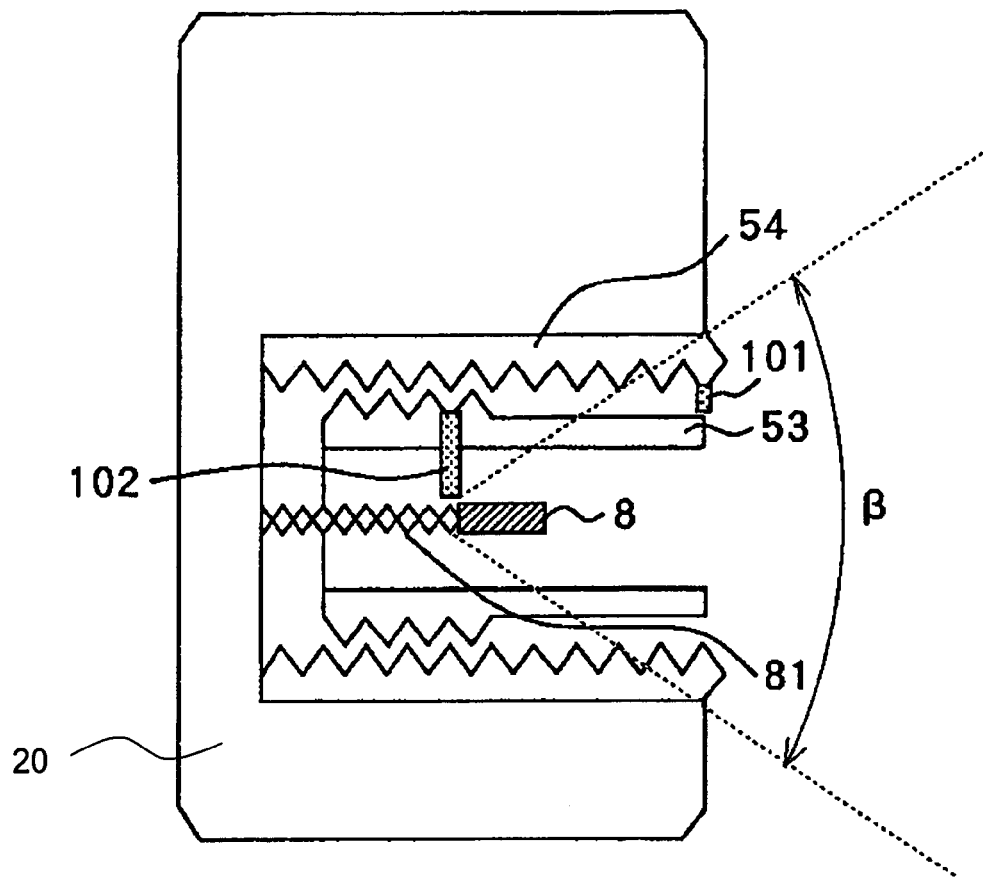
FIGS. 25 and 26 are section views of the camera in Embodiment 4.
Figure 26:
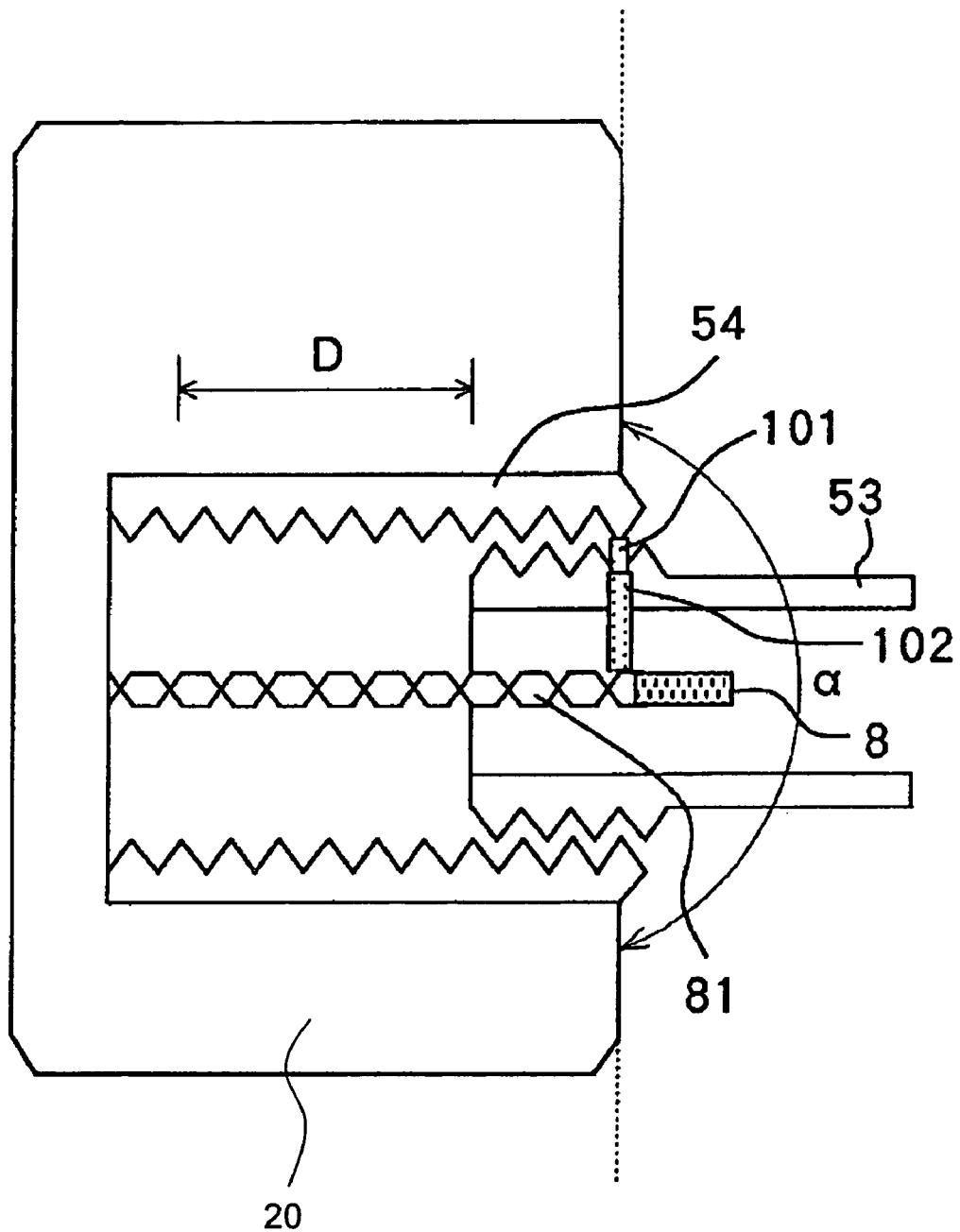
Figure 27:
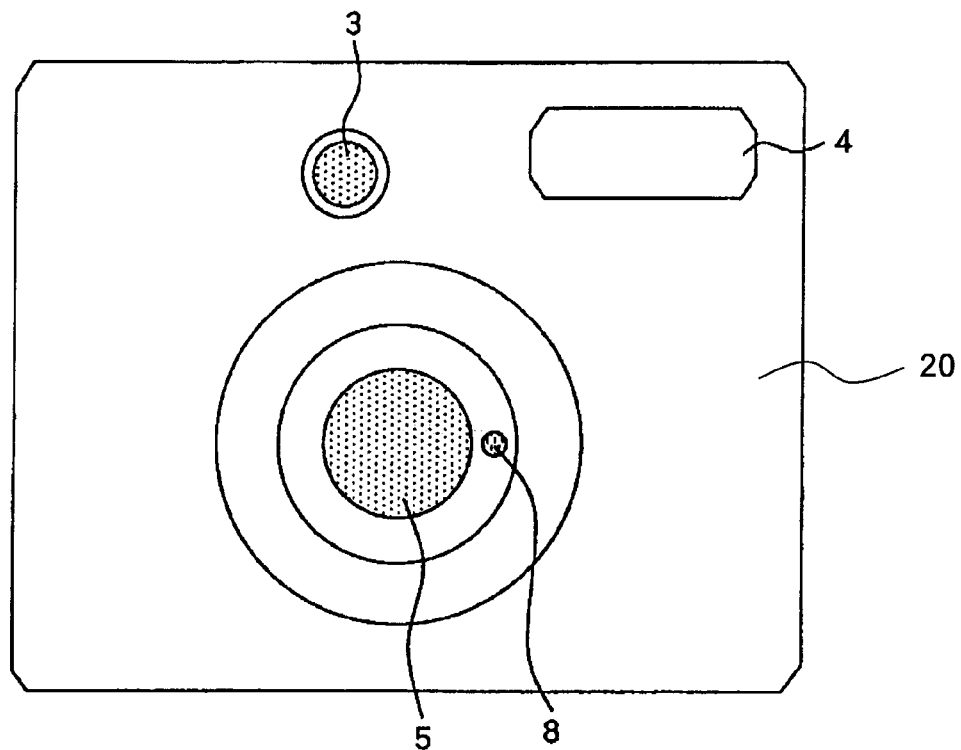
FIG. 27 is a front view of the camera in Embodiment 4.
Figure 28:
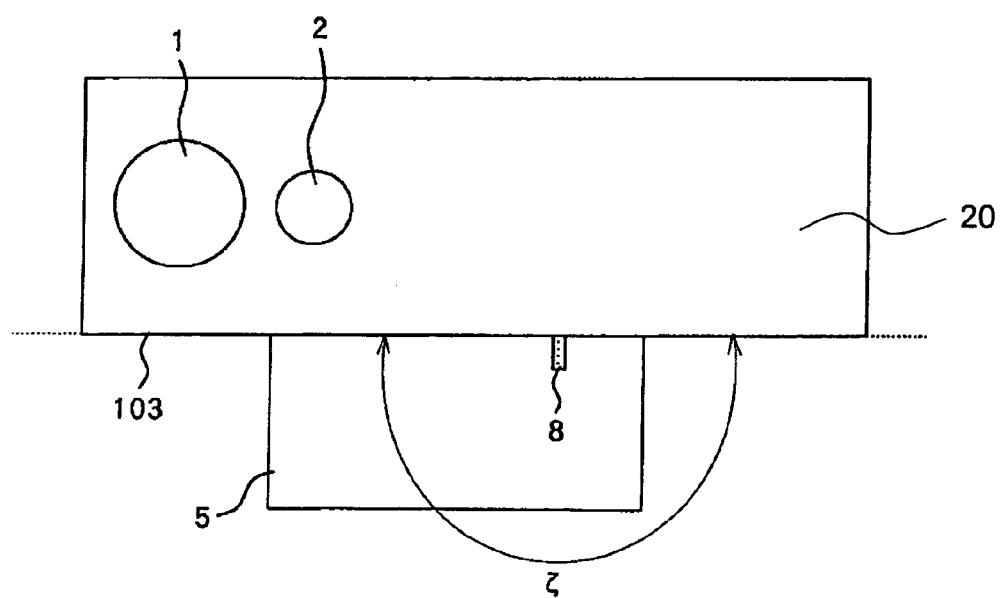
FIG. 28 is a top view of the camera in Embodiment 4.

FIG. 24 is a front perspective view of the digital camera on which an antenna 8 is mounted. FIGS. 25 and 26 are section views of the digital camera taken along a dashed line A in FIG. 24. FIG. 25 shows the camera when a barrel is collapsed, while FIG. 26 shows the camera when it can take images. FIG. 27 is a front view of the digital camera in FIG. 24. FIG. 28 is a top view of the digital camera when it can take images.

In FIG. 25, reference numeral 101 shows a brush fixed to a fixed barrel 54 and made of a conductive material. Reference numeral 102 shows a metal member for providing electrical conductivity for part of a holding barrel 53 formed of a mold member. The antenna 8 extends substantially in parallel with an optical axis direction in contrast to Embodiment 1.

Next, the operation of the digital camera in Embodiment 4 will be described. First, a power switch 1 is pressed to turn on the digital camera. The digital camera has at least an image-taking mode, a reproduction mode, and a communication mode. The communication mode includes a still image transfer mode for transferring a still image file after image-taking to another communication terminal through a wireless LAN and a live image transfer mode for transferring a live image during image-taking.

When the image-taking mode or the communication mode is selected by operating a mode selection dial forming part of an operation member 34 as shown in FIG. 6, a lens barrel driving circuit 50 applies torque to a barrel driving motor to drive the holding barrel 53 forward in the optical axis direction. The holding barrel 53 projects forward as shown in FIG. 26.

The holding barrel 53 in FIGS. 25 and 26 is formed of the mold member. A tap, not shown, is formed on the inner periphery of the fixed barrel 54 and the outer periphery of the holding barrel 53, and the fixed barrel 54 and the holding barrel 53 engage with each other. The holding barrel 53 is formed to move forward in the optical axis direction in response to the driving force from the lens barrel driving circuit 50.

As shown in FIG. 26, the holding barrel 53 is controlled to move by a predetermined distance D. This movement causes the metal member 102 fitted in (or connected to) the holding barrel 53 to come into contact with the brush 101.

When the fixed barrel 54 is made of a conductive material (or the brush 101 may be only partially connected to the metal exterior), connection can be established to the exterior made of metal (or the exterior may be formed by applying a conductive coating on a mold member). After the lens barrel is driven forward in the optical axis direction by the predetermined distance D, it is driven to be collapsed in a camera body 20 and then the electrical connection is broken between the metal member 102 and the conductive brush 101 as shown in FIG. 25.

The antenna 8 is mounted on the section along the dashed line A in FIG. 24 of the holding barrel 53 which can move in the optical axis direction. As shown in FIG. 25, it is retracted in the camera body 20 when the lens barrel is collapsed, while it is projected outside the camera body 20 when the lens barrel is driven to the position at which images can be taken as shown in FIG. 26.

Energy is supplied to the antenna 8 by using a cable 81 which can expand and contract in the optical axis direction such that the cable 81 expands when the holding barrel 53 is driven to the position at which images can be taken and the cable 81 contracts when the holding barrel 53 is moved into the camera body 20 in which it is collapsed. The energy supply to the antenna 8 is stopped in an image-taking mode, while the energy supply to the antenna 8 is performed in a communication mode.

The metal member 102 is connected to establish a ground for the antenna 8 in FIG. 26. When the lens barrel is moved forward in the optical axis direction, the metal member 102, the brush 101, and the conductive exterior are electrically connected to each other, and the area of the front surface of the camera (103 in FIG. 28) is ensured as a GND plane of the antenna 8, thereby allowing an ideal antenna (a virtual antenna) to be formed.

According to Embodiment 4, since the antenna 8 is disposed at the position where it projects from the camera body 20, the antenna 8 is not hidden in a user's hand when the user holds the camera. This can reduce the possibility that the human body may prevent wireless communication.

Since the antenna 8 is formed in the lens barrel disposed in the center of the camera, wireless communication can be performed under an ideal radio wave state in terms of sensitivity and directivity.

When the communication mode is selected, the antenna 8 is supplied with energy and the antenna 8 can be automatically driven to the position where it projects from the camera body 20.

The radio wave state can be detected to optimally set the position and the direction of the antenna 8 in accordance with the detection result.

In addition, when the lens barrel is made of a conductive material (when a metal exterior is used), the conductive material can be formed as part of the GND plane for the antenna 8 to provide an ideal antenna.

As described above, according to each of Embodiments 1 to 4, the antenna is disposed in the movable portion which can be moved to the position where it projects from the camera body for image-taking or image observation. It is thus possible to reduce the possibility that the metal material or the like included in the camera body may prevent wireless communication.

This application claims foreign priority benefits based on Japanese Patent Application No. 2004-319056, filed on Nov. 2, 2004, which is hereby incorporated by reference herein in its entirety as if fully set forth herein.

What is claimed is:

1. A camera comprising:
   a camera body;
   a display device configured to display images;
   a hinge member configured to couple one side of the display device to the camera body such that the display device is rotatable about two axes with respect to the camera body; and
   an antenna that is disposed at another side of the display device opposite to the one side at which the hinge member is provided, the antenna being disposed in parallel with the other side of the display device;
   a mode setting unit configured to set a mode of the camera to any one of an image-taking mode, a reproduction mode and a communication mode; and
   a control unit configured to stop supplying energy to the antenna when the image-taking mode or the reproduction mode is set.

* * * * *